(12) United States Patent
Bentley

(10) Patent No.: US 12,464,604 B2
(45) Date of Patent: Nov. 4, 2025

(54) SYSTEM HAVING DISCRETE ZONE ENERGY TRANSMISSION UTILIZING HEATING ELEMENT ARRAY AND OBJECT OCCUPANCY AND LOCATION SENSING

(71) Applicants: BSH Home Appliances Corporation, Irvine, CA (US); BSH Hausgeräte GmbH, Munich (DE)

(72) Inventor: Garrett Bentley, Knoxville, TN (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 867 days.

(21) Appl. No.: 17/726,580

(22) Filed: Apr. 22, 2022

(65) Prior Publication Data

US 2023/0345585 A1 Oct. 26, 2023

(51) Int. Cl.
*H05B 1/02* (2006.01)
*A47L 15/42* (2006.01)
(Continued)

(52) U.S. Cl.
CPC ........ *H05B 1/0252* (2013.01); *A47L 15/4295* (2013.01); *A47L 15/46* (2013.01); *A47L 15/485* (2013.01); *F24C 7/046* (2013.01); *F24C 7/085* (2013.01); *F26B 3/30* (2013.01); *G06V 10/764* (2022.01); *G06V 20/68* (2022.01);
(Continued)

(58) Field of Classification Search
CPC ............. H05B 1/0252; H05B 1/0263; H05B 2213/03; H05B 2213/05; A47L 15/4295; A47L 15/46; A47L 15/485; A47L 2401/04; A47L 2501/11; F24C 7/046; F24C 7/085; F24C 7/067; F26B 3/30; G06V 10/764; G06V 20/68
See application file for complete search history.

(56) References Cited

U.S. PATENT DOCUMENTS 5,282,145 A 1/1994 Lipson
5,658,478 A 8/1997 Roeschel
(Continued)

FOREIGN PATENT DOCUMENTS

DE 10201108721 A1 5/2013
DE 102018215429 B4 3/2020

*Primary Examiner* — Robert G Bachner
(74) *Attorney, Agent, or Firm* — Michael E. Tschupp; Brandon G. Braun; Andre Pallapies

(57) ABSTRACT

A discrete zone energy transmission system is provided. The system includes an object treatment area, an array of energy transmission elements configured to direct energy toward predetermined zones in the treatment area, a sensor configured to detect a presence and a location of an object in the treatment area, and a controller in communication with the array of energy transmission elements and the sensor. The controller is configured to receive presence and location data from the sensor, assign the data to the predetermined zones, and control an operation of the array of energy transmission elements to selectively radiate energy from the array of energy transmission elements only toward a select number of zones in the object treatment area based on the presence and location data, thereby selectively radiating the energy from the array of energy transmission elements only toward the object in the treatment area.

25 Claims, 19 Drawing Sheets

(51) Int. Cl.
*A47L 15/46* (2006.01)
*A47L 15/48* (2006.01)
*F24C 7/04* (2021.01)
*F24C 7/08* (2006.01)
*F26B 3/30* (2006.01)
*G06V 10/764* (2022.01)
*G06V 20/68* (2022.01)

(52) U.S. Cl.
CPC ........ H05B 1/0263 (2013.01); *A47L 2401/04* (2013.01); *A47L 2501/11* (2013.01)

(56) References Cited

U.S. PATENT DOCUMENTS

| | | |
|---|---|---|
| 6,693,262 B2 | 2/2004 | Gerola |
| 8,530,842 B2 | 9/2013 | Has |
| 10,708,987 B2 | 7/2020 | Kreiner |
| 2016/0192446 A1 | 6/2016 | Seddik |
| 2022/0047108 A1* | 2/2022 | Poulton .................... A23L 5/12 |

* cited by examiner

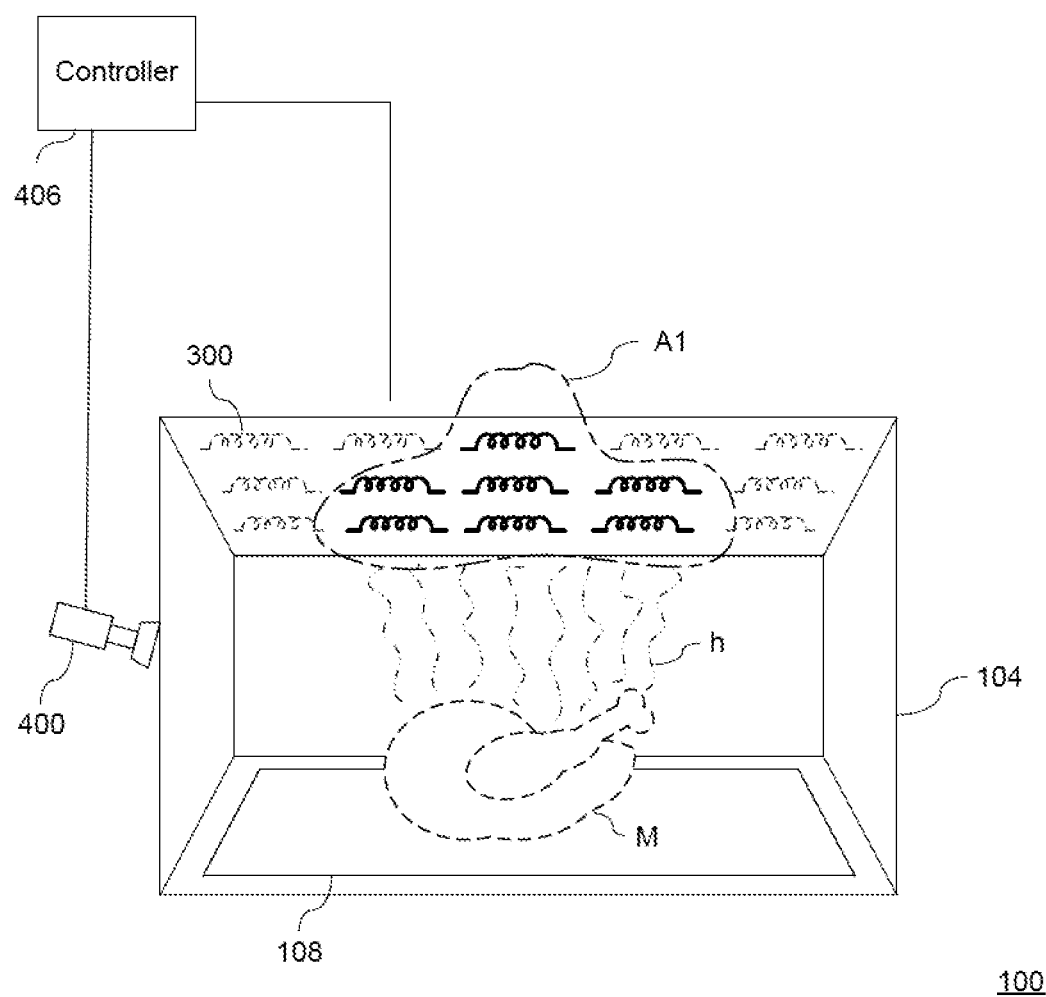
FIG. 3A
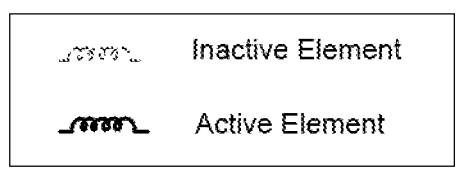

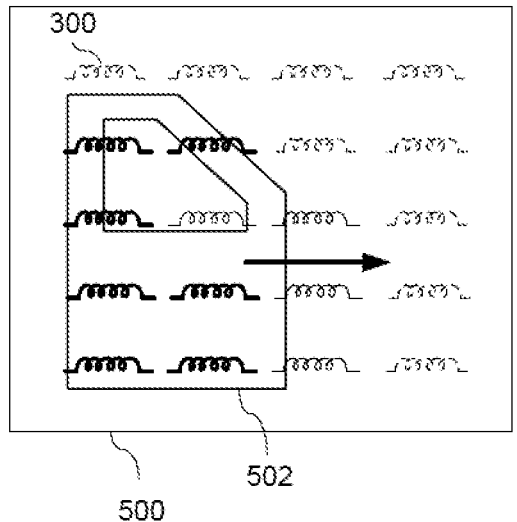 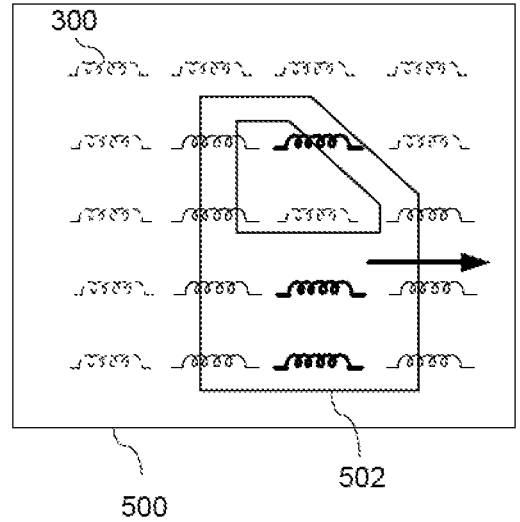
FIG. 12A            FIG. 12B
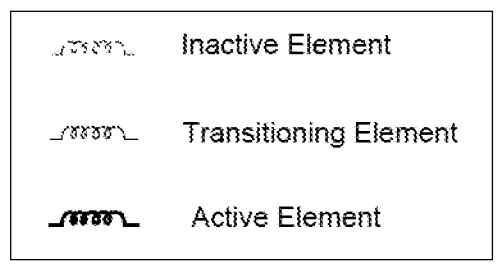

SYSTEM HAVING DISCRETE ZONE ENERGY TRANSMISSION UTILIZING HEATING ELEMENT ARRAY AND OBJECT OCCUPANCY AND LOCATION SENSING

FIELD OF THE INVENTION

The present invention is directed to a discrete zone energy transmission system, and more particularly, to a home cooking appliance having a discrete zone energy transmission system having an array of energy transmission elements and at least one sensor configured to detect a presence and a location of at least one object.

BACKGROUND OF THE INVENTION

Some conventional home cooking appliances may have a broiler function. Such home cooking appliances may include one or two broil burners or heating elements (typically each between 1000-3000 W power output) in an oven cavity for cooking food. For example, an appliance may include two smaller broil burners that are side by side, while another appliance may include a single, large broil burner that covers a majority of the top of the oven cavity. With reference to FIG. 1, a conventional home cooking appliance 10 having a broiler function may include a housing 12 having a cooking compartment 14 and a control panel 16. A shelf 18 can be provided for supporting items to be cooked within the cooking compartment 14. Such a home cooking appliance may include one or two broil burners or heating elements 20 (typically each between 1000-3000 W power output) in an oven cavity for cooking food. As shown in FIG. 2, an object M, such as a food item to be cooked (shown by dashed lines), can be supported on a cooking sheet and placed into the cooking compartment 14 to be cooked under a broil element or gas burner 20. Such a home cooking appliance may provide a relatively uniform area of infrared heat h covering the entire tray near uniformly with the heat h.

SUMMARY OF THE INVENTION

The present invention recognizes that a home cooking appliance having a conventional broil element or gas burner 20, as shown for example in FIGS. 1 and 2, not only heats the food in the compartment, but also heats the empty spaces in the cooking compartment with the same or uniform intensity of energy (or relatively the same or relatively uniform intensity of energy). The present invention further recognizes that, while some conventional appliances may include two, or even three, broil elements, such as halogen lamps, such conventional arrangements still heat both the food in the compartment and the empty spaces in the cooking compartment surrounding the food in the somewhat large regions of each broil element or gas burner, which is similar to a single broil element or gas burner arrangement. As a result, the present invention further recognizes that such conventional appliances undesirably consume power to heat empty space, and also provide little flexibility for cooking operations.

These problems and others are addressed by the present invention, an exemplary embodiment of which comprises a discrete zone energy transmission system, comprising an object treatment area, an array of energy transmission elements configured to direct energy toward a plurality of predetermined zones in the object treatment area, at least one sensor configured to detect a presence and a location of at least one object in the object treatment area, and a controller in communication with the array of energy transmission elements and the at least one sensor. The controller can be configured to receive presence and location data of the at least one object from the at least one sensor, assign (e.g., to map or assign in a mathematical correspondence) the presence and location data to the plurality of predetermined zones, control an operation of the array of energy transmission elements to selectively radiate energy from the array of energy transmission elements only toward a select number of zones of the plurality of predetermined zones in the object treatment area based on the presence and location data, thereby selectively radiating the energy from the array of energy transmission elements only toward the at least one object in the object treatment area.

In this way, the present invention can minimize or prevent power being used to radiate energy toward empty spaces in the object treatment area surrounding the object (e.g., the empty spaces in a cooking compartment surrounding the food to be heated or cooked). The present invention can refine or focus the regions or zones (e.g., less than all of the regions or zones) in the object treatment area to be radiated with energy to select zones or groups of zones. The system also can be configured to vary, or be capable of varying, the intensity (or magnitude) of the radiated heat in different regions or zones so that different parts of the same object, or different parts or all of multiple objects, may be radiated at different energy intensities in the same treatment compartment. The examples of the present invention can provide improved flexibility and capabilities of enabling different zones of the object treatment compartment to be radiated with different energy intensities, thereby enabling different parts of the same object, or different parts or all of multiple objects, to be radiated at different energy intensities in the same treatment compartment.

According to the examples of the invention, a discrete zone energy transmission system can be provided to selectively radiate energy from an array of energy transmission elements only toward a select number of zones out of a plurality of predetermined zones in an object treatment area based on the presence and location of one or more objects in the object treatment area, thereby selectively radiating the energy from the array of energy transmission elements only toward the object, or objects, in the object treatment area.

In some examples, the controller can be configured to selectively or individually control the energy radiated from each of the energy transmission elements of the array of energy transmission elements, such as by controlling a magnitude, direction, intensity, etc. of the energy radiated from one or more energy transmission elements of the array of energy transmission elements, controlling a power supplied to one or more energy transmission elements of the array of energy transmission elements, etc. In other examples, the at least one sensor can be configured to detect a presence and a location of more than one object in the object treatment area, such as a plurality of objects in the object treatment area. The controller can be configured to control the operation of the array of energy transmission elements to selectively radiate energy from the array of energy transmission elements toward the select number of zones based on the presence and location data to thereby selectively radiate the energy from the array of energy transmission elements only toward each of the plurality of objects. More particularly, in some examples, the controller can be configured to control the operation of the array of energy transmission elements to radiate a first intensity (or magnitude) of energy from at least one of the energy transmission elements toward a first zone of the select number of zones, the first zone corresponding to at least a part of a first object of the plurality of objects, and radiate a second intensity (or magnitude) of energy from at least one of the energy transmission elements toward a second zone of the select number of zones, the second zone corresponding to at least a part of a second object of the plurality of objects.

In this way, in an illustrative example of a home cooking appliance, a discrete zone energy transmission system according to the invention can be configured to heat only the locations where food is located on a cooking sheet, wire rack, etc. The system also can be configured to vary, or be capable of varying, the intensity (or magnitude) of the radiated heat in different regions so that multiple food items may be cooked at different energy intensities on the same sheet of food in the same cooking compartment. In some examples, the system can be configured to vary, or be capable of varying, the intensity (or magnitude) of the radiated heat in different regions such that different areas or parts of the same food item may be cooked at different energy intensities. For example, some food items to be cooked may have a different thickness, density, consistency, or make-up in different areas or parts. In other examples, a food item may be comprised of multiple food items or multiple types of food or ingredients. The examples of the present invention can provide improved flexibility and capabilities of enabling different parts of the same food item to be cooked at different energy intensities.

In other illustrative examples, such as an appliance for drying, curing, etc. objects, drying, curing, etc. coatings on, or surfaces of, an object, etc., a discrete zone energy transmission system according to the invention can be configured to heat only the locations where the object is located. The system also can be configured to vary, or be capable of varying, the intensity (or magnitude) of the radiated heat in different regions so that multiple objects may be dried or cured at different energy intensities in the same treatment compartment. In some examples, the system can be configured to vary, or be capable of varying, the intensity (or magnitude) of the radiated heat in different regions such that different areas or parts of the same object may be dried or cured at different energy intensities. For example, some objects, or coatings thereon, may have a different thickness, density, consistency, or make-up in different areas or parts. In other examples, some objects, or coatings thereon, may have a different level or amount of wetness or saturation, etc. In still other examples, an object may be comprised of multiple objects or multiple types of objects or materials. The examples of the present invention can provide improved flexibility and capabilities of enabling different parts of the same object to be radiated with different energy intensities.

The examples of the present invention can replace one or more large energy transmission elements, such as one or more heating elements having between 1000-3000 W power output, with an array of smaller energy transmission elements, such as an array of smaller, discrete heating elements. The examples of the present invention are not limited to any particular number, size (physical or power output), or arrangement of discrete heating elements.

In some examples, each of the energy transmission elements in the array can be individually addressable and controllable, for example, via a computer-controlled (e.g., program controlled) switching system having a controller and a plurality of electronic switching elements, switches, or relays, or having a controller and a multiplexing system (e.g., one or more multiplexors) to manage high frequency switching of individual or groups of circuit supplying power to the energy transmission elements in the array. In some examples, clusters or groupings of energy transmission elements may be controlled via a single switch, thereby reducing the number of discrete circuits. In some examples, each individual energy transmission element, such as an individual heating element, may consist of an element (e.g., heater element) and a number of components to regulate power and energy flow for that component (such as one or more diodes to prevent back flow of current, etc.).

In some examples, the array of energy transmission elements can be arranged in a plurality of rows and a plurality of columns. In some examples, the rows and columns of the array can have a two-dimensional planar arrangement, for example to correspond to a substantially flat or planar wall or panel forming part of the object treatment area, or a three-dimensional arrangement, such as a curved arrangement, for example to correspond to a curved wall or panel forming part of the object treatment area. For example, an object treatment area can be formed by a domed or semi-spherical cavity or chamber, and the rows and columns of the array can have a three-dimensional arrangement, such as a curved arrangement, for example to correspond to a portion, or all, of the curved wall forming the domed or semi-spherical cavity or chamber. The invention is not limited to any particular arrangement of the array of energy transmission elements. In other examples, rather than being arranged in, or assigned in, rows and columns, the array of energy transmission elements can be arranged in, or assigned in, other special coordinates, such as rows of closed circular or ring-shaped patterns, points or indices of a three-dimensional shape, such as a cube shape, etc.

In some examples, the discrete zone energy transmission system can include a switching system having a plurality of switches, each switch of the plurality of switches configured to individually activate each energy transmission element of the array of energy transmission elements. The controller can be configured to control the switching system. In other examples, the switching system can be part of the controller or another component. In some examples, the switching system can include a plurality of switches, with each switch of the plurality of switches being configured to activate a group of energy transmission elements of the array of energy transmission elements.

In other examples, the discrete zone energy transmission system can include a multiplexing system configured to individually activate each energy transmission element of the array of energy transmission elements, or one or more groups of energy transmission elements. The controller can be configured to control the multiplexing system. In other examples, the multiplexing system can be part of the controller or another component.

In some examples, the at least one sensor can include one or more cameras, image sensors, vision sensors, or other sensors configured to detect a presence and a location of one or more objects in the object treatment area.

In some examples, the discrete zone energy transmission system can include a controller configured to communicate with the sensor and/or receive image data from the sensor, such as a camera, and then determine an identifying characteristic of the at least one object in the object treatment area from the image data. The controller can be configured to control the operation of the array of energy transmission elements to selectively radiate energy from the array of energy transmission elements based on the determined identifying characteristic of the at least one object.

An identifying characteristic of the at least one object can include, for example, a type, shape, make-up, etc. of the object. For example, in the example of a home cooking appliance, some food items to be cooked may have a different thickness, density, consistency, or make-up in different areas or parts, may be comprised of multiple food items or multiple types of food or ingredients, and/or may require different cooking temperature, duration, cycles, etc. for optimal cooking. The examples of the present invention can provide improved flexibility and capabilities of determining what food item is in the cooking chamber to better determine (e.g., selectively determine) how the cooking program should operate (e.g., a smart cooking program) and how the array of energy transmission elements should be selectively operated.

In other illustrative examples, such as an appliance for drying, curing, etc. objects, drying, curing, etc. coatings on, or surfaces of, an object, etc., some objects, or coatings thereon, may have a different thickness, density, consistency, or make-up in different areas or parts. In other examples, some objects, or parts of an object, coatings thereon, etc., may have a different level or amount of wetness or saturation, etc. In still other examples, an object may be comprised of multiple objects or multiple types of objects or materials.

For example, in an example of a dishwasher, various types and materials of cookware, such as drinkware, plates, pots, cutlery, etc. may be present in the same object treatment area. Some of the objects may comprise materials that conduct heat more efficiently than others, that have a different thickness, density, consistency, or make-up in different areas or parts, and/or that dry at different rates, intensity, etc., or for which it is desirable to dry at different rates, intensity, etc., while some of the objects or parts thereof may have surfaces or shapes that collect or capture more rinsing fluid than others. Some objects or parts thereof may be positioned in a manner in which energy from the energy transmission elements is radiated more directly onto surfaces of the object or in another manner in which surfaces of the object or parts thereof are angled or blocked by other parts thereof, other objects, or other components in such a way as to reduce or limit an exposure of the object to the radiated energy. The examples of the present invention can provide improved flexibility and capabilities of determining one or more identifying characteristics of the object (or objects) to better determine (e.g., selectively determine) how a program, cycle, or other operation for drying, curing, etc. should operate (e.g., a smart program) and how the array of energy transmission elements should be selectively operated.

In other examples, such as a dryer device, curing device, etc. (e.g., an industrial dryer or curing device, etc.) having a discrete zone energy transmission system according to the invention, one or more objects, or parts thereof, may comprise materials that conduct heat more efficiently than others, that have a different thickness, density, consistency, or make-up in different areas or parts, and/or that dry at different rates, intensity, etc., or for which it is desirable to dry at different rates, intensity, etc. Some objects or parts thereof may be positioned in a manner in which energy from the energy transmission elements is radiated more directly onto surfaces of the object or in another manner in which surfaces of the object or parts thereof are angled or blocked by other parts thereof, other objects, or other components in such a way as to reduce or limit an exposure of the object to the radiated energy. The examples of the present invention can provide improved flexibility and capabilities of determining one or more identifying characteristics of the object (or objects) to better determine (e.g., selectively determine) how a program, cycle, or other operation for drying, curing, etc. should operate (e.g., a smart program) and how the array of energy transmission elements should be selectively operated.

In some examples, the controller can be configured to identify a stored operation program, cycle, or the like corresponding to the determined identifying characteristic or characteristics of the at least one object and to control the operation of the array of energy transmission elements to selectively radiate energy from the array of energy transmission elements based on the identified stored operation program.

In some examples, the controller can be configured such that a user, or another system (e.g., an automated system) identifies or confirms the part of the object treatment area occupied by the target object to be energized (e.g., heated).

For purposes of the invention, a controller can be, for example, an electronic unit which may be at least partially integrated in a control unit and/or a regulating unit of the system or appliance. The controller can include a computation unit and a memory unit with a control program and/or regulating program being stored therein and which is provided to be implemented by the computation unit. The controller can include a communication unit or interface unit configured to communicate with one or more other components of the system, such as one or more energy transmission elements of the array, the at least one sensor, etc., for example, by sending and receiving signals, data, etc.

The control unit can be configured to activate, control, and/or regulate aspects of the operation of one or more of the energy transmission elements of the array (such as magnitude, intensity, power, activation time or duration, etc.), the at least one sensor (such as activation, operating time or duration, or other sensing parameters, etc.), etc., and/or to activate, control, and/or regulate aspects of the operation of one or more other components that control or affect the operation of one or more of the energy transmission elements of the array, the at least one sensor, etc.

For purposes of the invention, the at least one sensor can include one or more cameras, image sensors, vision sensors, or other sensors configured to detect a presence and a location of one or more objects in the object treatment area. The invention is not limited to any particular type, arrangement, or quantity, etc. of sensor, camera, etc. One or more sensors can include, for example, an infrared camera or infrared sensor, or another type of sensor, such as an ultrasonic, radar, lidar, light-reflectivity, or other type of positioning sensor. In some examples in which more than one sensor is provided, the sensors can be the same type, etc. or one or more of the sensors can be different from another sensor.

The at least one sensor, such as a camera, can be configured to be arranged within the object treatment area, outside the object treatment area, or integrated into a part of the object treatment area, such as a part of a wall, panel, ceiling, floor, viewing glass, door, or another component, etc.

One or more sensors can be specifically designed for use in high temperature environments and/or can include a shielding for protecting the sensor or its components from the high temperature environment within the object treatment area such that the sensor is capable of capturing video imagery or other data from within the object treatment area while being protected from heat damage. For example, one or more sensors can include a shield and/or insulating element for protection against infrared or other types of energy transmission, heat, etc. Such a shield and/or insulating element can be fixed to, or integrally formed with, one or more sensors, or movably or temporarily coupled to, or adjacent to, one or more sensors, such as a movable opaque shield that opens during an instance in which the sensor is in use and closes when the sensor is not in use).

In some examples, the video imagery captured by the sensor (e.g., camera) can be displayed to a user or operator such that the user can observe the inside of the object treatment area without opening a door or entering the object treatment area, for example, to view the contents of the object treatment area such as food, packaging, cookware, etc. before, during, or after energy transmission.

In some examples, the sensor (or a system configured to control the sensor) can be configured to transmit (e.g., via wired or wireless communication) the presence and location data of an object (e.g., image data, video imagery captured by the sensor, a signal or data representing the video imagery, etc.) to the controller. In other example, the sensor, the controller, or another system configured to control the sensor, can be configured to transmit (e.g., via wired or wireless communication) the presence and location data of an object (e.g., image data, video imagery captured by the sensor, a signal or data representing the video imagery, etc.) to a display of the discrete zone energy transmission system, such as a display on a control panel, or to one or more of a display of another device, such as a smart phone, tablet computer, notebook computer, personal computer, etc.

By way of example, and for illustrated purposes only, aspects of the invention are described herein with reference to a home cooking appliance and other exemplary appliances and systems. However, the invention is not limited to any particular type of appliance or system. For example, a discrete zone energy transmission system according to the invention can be provided for a home cooking appliance, such as a standalone appliance or wall mounted appliance, such as a stand-alone oven, wall mounted oven, double oven, combination oven, countertop oven, microwave oven, air fryer, or a freestanding range, having an oven, broiler, steam oven, convection oven, and/or warming drawer, or another home appliance, such as a dishwasher, laundry washer or dryer, or other laundry dryer or press. In other examples, a discrete zone energy transmission system according to the invention can be provided for a dryer or curing device, such as an industrial dryer or curing device, and more particularly, an industrial paint drying or paint curing device for a manufacturing process, a drying device or system for a car wash, etc. In still other examples, a discrete zone energy transmission system according to the invention can be provided for a defrosting device or system, such as an automotive window defroster.

A discrete zone energy transmission system according to the invention is not limited to detecting a presence and a location of a stationary object in the object treatment area, but also can be configured for a moving object. For example, a discrete zone energy transmission system according to examples of the invention can be provided for objects that are intermittently or continuously in motion through the object treatment area, such as objects on a rotisserie, a conveyor or overhead carrier system, etc.

For example, in a home cooking appliance having a rotisserie or other device configured to move food while it is being cooked, a discrete zone energy transmission system according to examples of the invention can include one or more sensors configured to track a presence and a location of the food as it moves within the treatment area and the controller can be configured to intermittently or continuously receive presence and location data of the food from the at least one sensor. The controller can be configured to intermittently or continuously assign or map the received presence and location data of the food to a plurality of predetermined zones (e.g., corresponding to one or more of the energy transmission elements), and to control an operation of the individual energy transmission elements to selectively radiate energy from the array of energy transmission elements only toward a select number of zones where a part of the food is present as the food moves on the rotisserie or other device.

In other examples, in an industrial application, such as a dryer or curing device having a conveyor or overhead carrier system, etc., a discrete zone energy transmission system according to examples of the invention can include a series of sensors, such as a series of cameras or other sensors, configured to track a presence and a location of an object over time as the object transitions or moves through the treatment area. For example, a pair of opposing cameras can be provided at one or more areas along the direction of travel of the object. Additional cameras can be provided upstream or downstream of the path or direction of travel followed by the object. Other arrangements also are possible, such as cameras on only one side, cameras above the direction of travel, etc.

In an example, a controller can be configured to intermittently or continuously receive the presence and location data of the object from the cameras as the object progresses along the path of the conveyor or overhead carrier system. The controller can be configured to intermittently or continuously assign or map the received presence and location data of the object to a plurality of predetermined zones (e.g., corresponding to one or more of the energy transmission elements), and control an operation of the individual energy transmission elements to selectively radiate energy from the array of energy transmission elements only toward a select number of zones where a part of the object is present as the object progresses along the path of the conveyor or overhead carrier system, thereby selectively radiating the energy from the array of energy transmission elements only toward the parts of the object in the object treatment area even while the object progresses along the path of the conveyor or overhead carrier system.

In other examples, the controller can be configured to activate and deactivate individual energy transmission elements as the object moves away from one set of energy transmission elements toward a field of another set of individual energy transmission elements. For example, the controller can be configured to control a power output or intensity of the individual energy transmission elements as the object moves away from one set of energy transmission elements toward a field of another set of individual energy transmission elements. In this example, as the object moves past the fixed energy transmission elements, the controller can control the output of the individual energy transmission elements to transition from an activated state, such as a 100% power output, to a reduced percentage (e.g., less than the activated state) as the object moves past the energy transmission element over a predetermined period of time, and eventually to transition from the reduced percentage to a 0% or deactivated state after the object has moved completely past the energy transmission element. Similarly, as the object moves away from one set of energy transmission elements toward a field of another set of individual energy transmission elements, the controller can control the output of the individual energy transmission elements downstream of the path of the object to transition those energy transmission elements from a deactivated state, such as a 0% power output, to a reduced percentage (e.g., less than the eventual activated state) as the object moves into proximity of the energy transmission element over a predetermined period of time, and eventually to transition from the reduced percentage to a desired activated state, such as a 100% power output, as the object moves directly in front of the energy transmission element.

According to the examples of the present invention, a discrete zone energy transmission system can provide higher efficiency heating or curing of one or more objects having various characteristics. Furthermore, energy (e.g., heat) can be effectively radiated only to regions or zones occupied by one of the objects and/or in an area of the object where the energy is needed or desired.

Moreover, a total heating circuit can potentially have a higher output rating, while only utilizing the same or lower power as would be consumed by a conventional single heating element system. The examples of the invention can provide reduced switching load by using lower power on many switches or circuits instead of a small number of switches/relays/circuits requiring a high current load per switch cycle.

For industrial applications, the exemplary aspects of the invention may provide the potential to yield even more significant energy savings (i.e., greater energy consumption and/or cost savings). For example, the exemplary aspects of the invention can reduce the amount of power consumed by the system by avoiding consumption of power to radiate energy into the empty areas where no object is present, which, when compounded over high volumes and high variability in object or component profiles, can result in significant savings of power consumption and associated cost.

The invention is not limited only to a system having an array of energy transmission elements configured to direct energy, such as heat, infrared heat, etc. In other examples, a discrete zone energy transmission system according to the invention can include an array of energy transmission elements configured to direct other types of energy only toward a select number of zones of the plurality of predetermined zones in the object treatment area based on presence and location data of the object, thereby selectively radiating the other types of energy from the array of energy transmission elements only toward the at least one object in the object treatment area. For example, the energy transmission elements configured to direct ultraviolet light only toward the at least one object in the object treatment area. In other examples, the energy transmission elements configured to direct air only toward the at least one object in the object treatment area, such as compressed or pressurized air, and more particularly, compressed or pressurized air conveying particulates, such as sand for sand blasting operations, paint for paint spraying operations, etc.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein:

FIGS. 3A and 3B are schematic illustrations of a home cooking appliance having a discrete zone energy transmission system, according to an exemplary embodiment of the invention;

FIGS. 12A and 12B are schematic illustrations of an industrial curing oven having a discrete zone energy transmission system, according to an exemplary embodiment of the invention.

DETAILED DESCRIPTION OF THE EXEMPLARY EMBODIMENTS OF THE INVENTION

Figure 1:
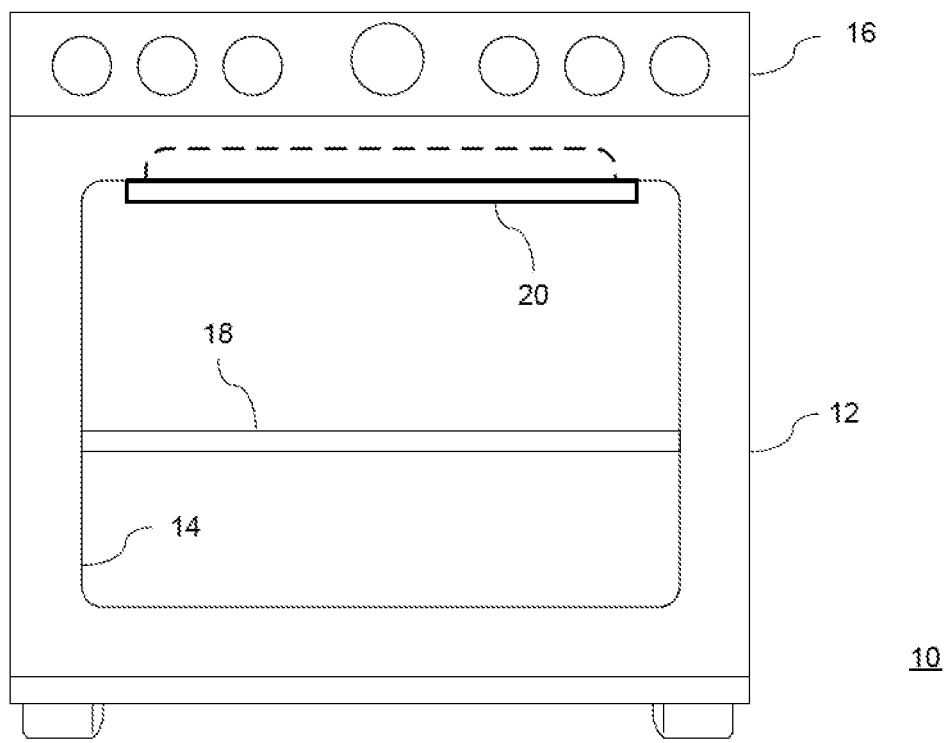
FIG. 1 is a front view of a conventional home cooking appliance.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, exemplary embodiments of a discrete zone energy transmission system will now be described with reference, for example, to FIGS. 3A-13E.

By way of example, and for illustrated purposes only, aspects of the invention are described herein with reference to example features of a home cooking appliance 100, as shown in FIGS. 3A-8.

The home cooking appliance 100 can include a housing 102 with a cooking chamber 104 accessible through an opening, an oven door 110 covering the opening and moveable about a hinge between an open position and a closed position, and a control panel 106 having a user input device for controlling operation of one or more heating elements and/or circulating fans in the cooking chamber 104 for performing a preheat operation, cooking operation, etc. The user input device can include one or more control knobs, touch sensitive input devices, etc. for controlling operation of the appliance. One or more oven racks 108 or other support devices can be provided within the cooking chamber 104. One of ordinary skill will recognize that other configurations are possible.

In the example shown in FIGS. 3A-8, the home cooking appliance 100 can include a discrete zone energy transmission system having an object treatment area (defined in this example by the cooking chamber 104) and an array of energy transmission elements (schematically illustrated by 300) configured to direct energy toward a plurality of predetermined zones (e.g., zones 1-12 shown in FIGS. 6B and 6C) in the object treatment area (defined in this example by the cooking chamber 104). The examples are not limited to any particular number, size (physical or power output), or arrangement of discrete heating elements 300 or predetermined zones. For illustrative purposes, the energy directed toward the predetermined zones is schematically shown as infrared heat h, for example, in FIGS. 3A and 3B. For clarity, the illustration of such energy transmission is omitted from some of the drawings.

The discrete zone energy transmission system can further include at least one sensor (in this example, a camera 400) configured to detect a presence and a location of at least one object M (in this example, a food item, such as a turkey) in the object treatment area (e.g., defined by 104) and a controller 406 in communication with the array of energy transmission elements 300 and the at least one sensor (e.g., 400). The controller 406 can be configured to receive presence and location data of the at least one object M from the at least one sensor (e.g., 400), and assign (e.g., map or assign in a mathematical correspondence) the presence and location data to the plurality of predetermined zones (e.g., 1-12). The controller 406 can be configured to control an operation of the array of energy transmission elements 300 to selectively radiate energy from the array of energy transmission elements 300 only toward a select number of zones A1 (e.g., zones 3, 6, 7, 10, and 11) of the plurality of predetermined zones (e.g., zones 1-12) in the object treatment area based on the presence and location data, thereby selectively radiating the energy from the array of energy transmission elements 300 only toward the at least one object M in the object treatment area. In the illustrated examples, inactive energy transmission elements 300 are schematically shown by dashed lines, and active energy transmission elements 300 are shown by solid lines. For illustrative purposes, different power levels, intensities, magnitudes, etc., or transitions between the same, of the active energy transmission elements 300 are schematically shown by different line thicknesses.

In some examples, the controller 406 can be configured to control the operation of the array of energy transmission elements 300 to radiate one or more different intensities (or magnitudes) of energy from one or more of the energy transmission elements 300 toward different zones of the select number of zones corresponding to different parts of the same or different object. In this way, in an illustrative example of a home cooking appliance, a discrete zone energy transmission system according to the invention can be configured to vary, or be capable of varying, the intensity (or magnitude) of the radiated heat in different regions so that different areas of the same food and/or multiple food items may be cooked at different energy intensities in the same cooking compartment. For example, with reference to the example in FIG. 3B, the at least one sensor (in this example, a camera 400) can be configured to detect a presence and a location of multiple objects M and M' (in this example, schematically illustrated as food items) in the object treatment area (e.g., defined by 104). The controller 406 can be configured to receive presence and location data of each of the objects M and M' from the at least one sensor (e.g., 400), and assign (e.g., map or assign in a mathematical correspondence) the presence and location data to the plurality of predetermined zones (e.g., 1-12). The controller 406 can be configured to control an operation of the array of energy transmission elements 300 to selectively radiate energy from the array of energy transmission elements 300 only toward a select number of zones A1 and A2 of the plurality of predetermined zones in the object treatment area based on the presence and location data, thereby selectively radiating the energy from the array of energy transmission elements 300 only toward the objects M and M' in the object treatment area.

Figure 3B:
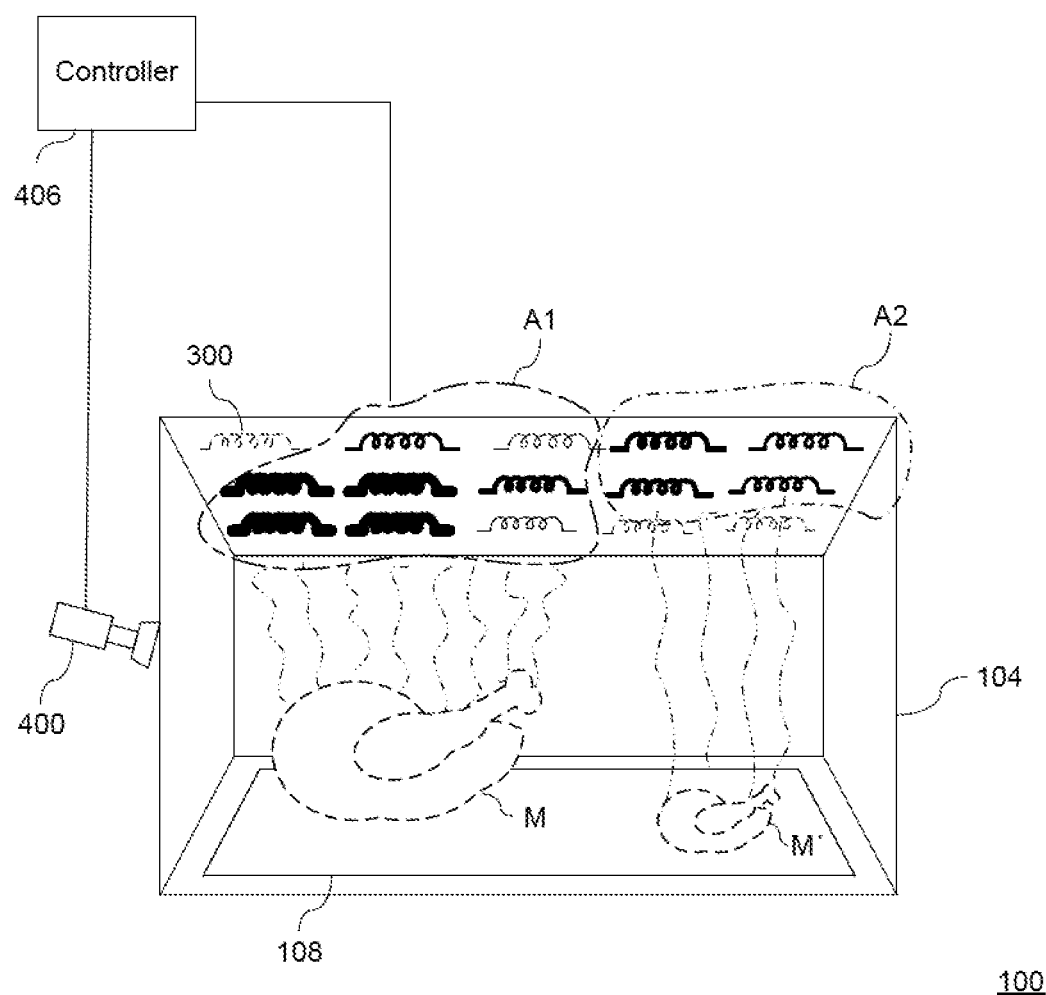
Figure 3B:
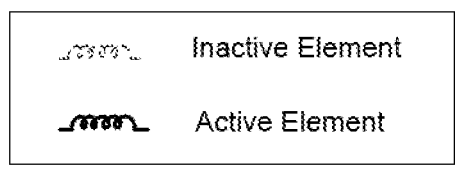
Figure 4:
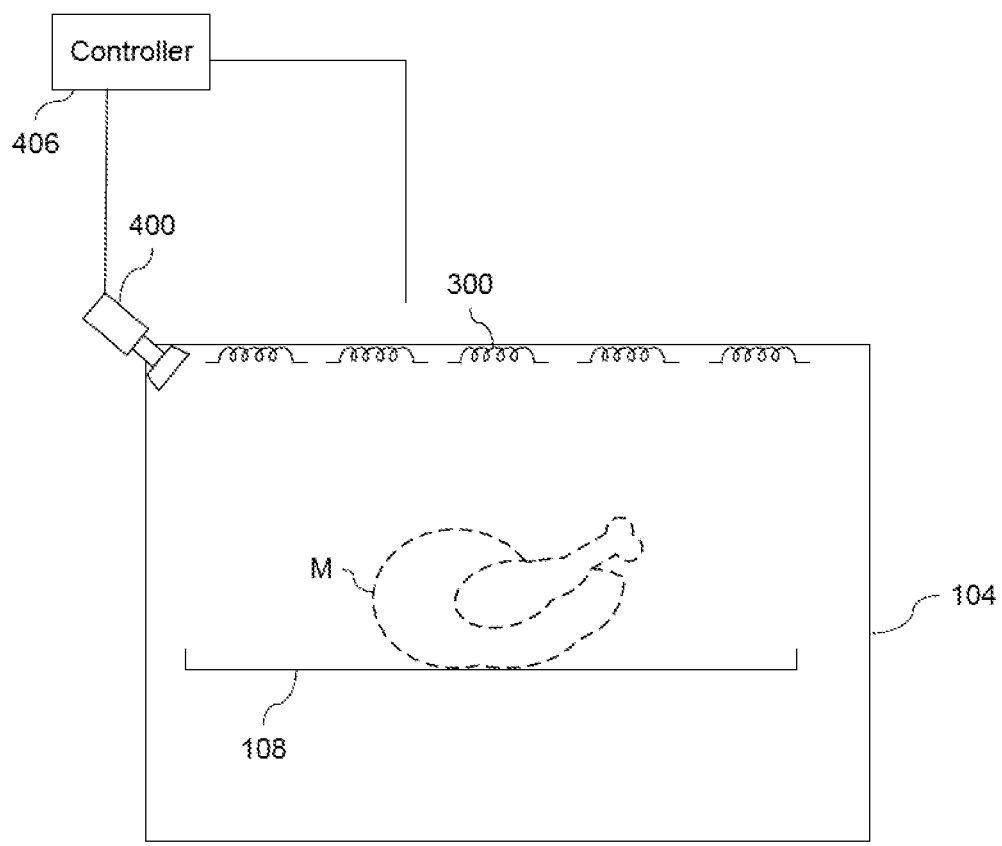
FIG. 4 is a schematic illustration of a home cooking appliance having a discrete zone energy transmission system, according to an exemplary embodiment of the invention.
Figure 5:
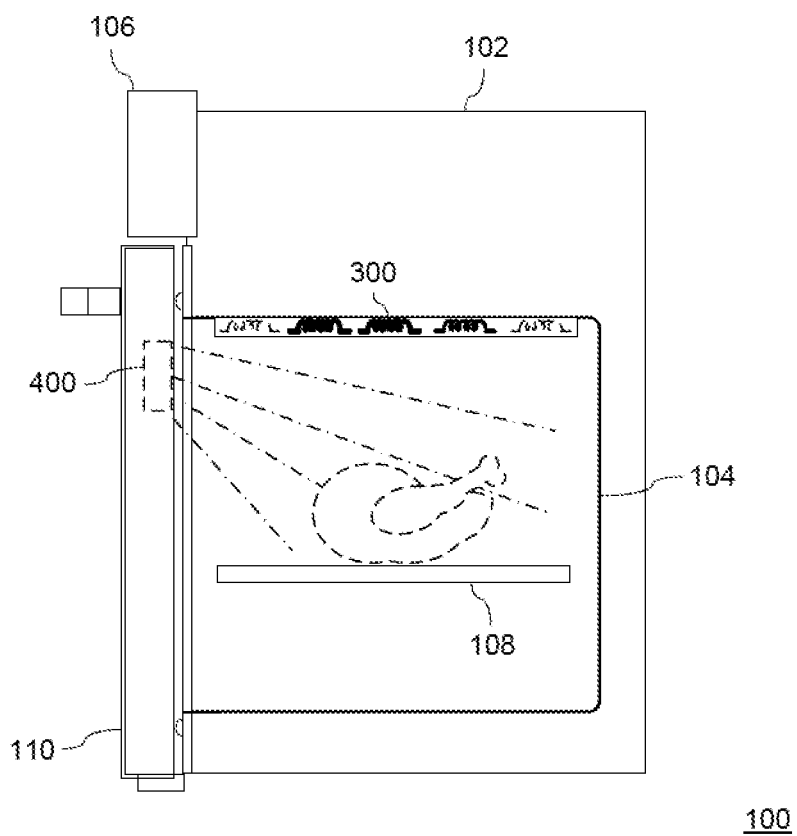
FIG. 5 is another schematic illustration of a home cooking appliance having a discrete zone energy transmission system, according to an exemplary embodiment of the invention.
Figure 5:
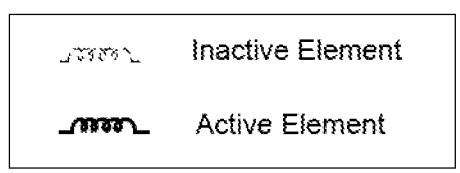

In some examples, the controller 406 can be configured to control an operation of the array of energy transmission elements 300 to selectively radiate different intensities (e.g., different magnitudes) of energy from one or more of the energy transmission elements 300 toward a select number of zones in A1 and/or A2 of the plurality of predetermined zones in the object treatment area based on the presence and location data, and in some examples, along with other data related to the particular objects M and M' (e.g., object size, shape, density, thickness, material, percentage of a zone that is occupied by a part of an object, etc.), thereby selectively radiating the energy from the array of energy transmission elements 300 toward the objects M and M' in the object treatment area, as well as toward different areas or parts of the objects M and/or M'. For example, FIG. 3B schematically illustrates the energy transmission elements 300 having different intensities corresponding to different objects M and M', as well as corresponding to different areas or parts of the objects M and M', using different line thicknesses (e.g., a greater intensity is shown by a thicker line thickness).

Figure 6A:
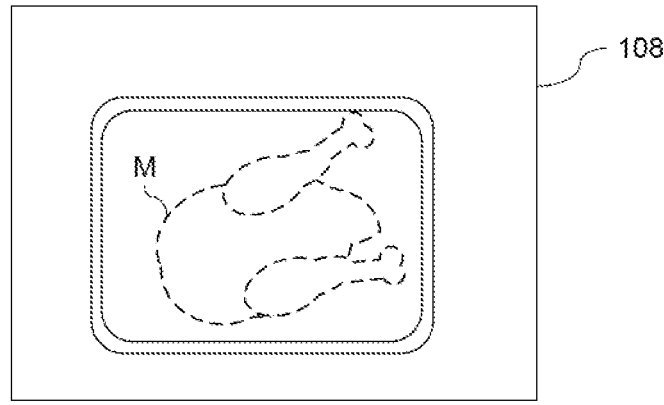
FIGS. 6A-6F are schematic plan views of a heating zone array of a home cooking appliance having a discrete zone energy transmission system, according to an exemplary embodiment of the invention.
Figure 6B:
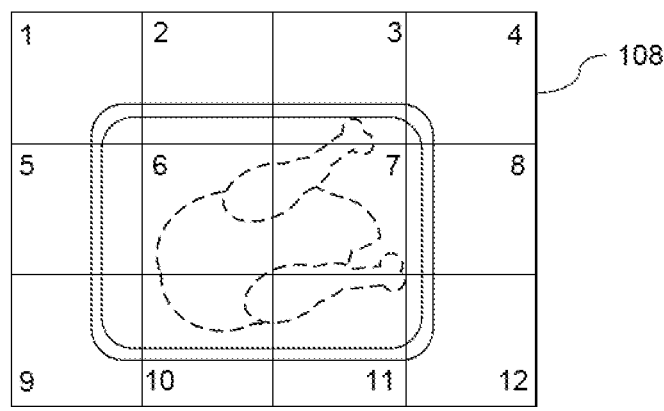
Figure 6C:
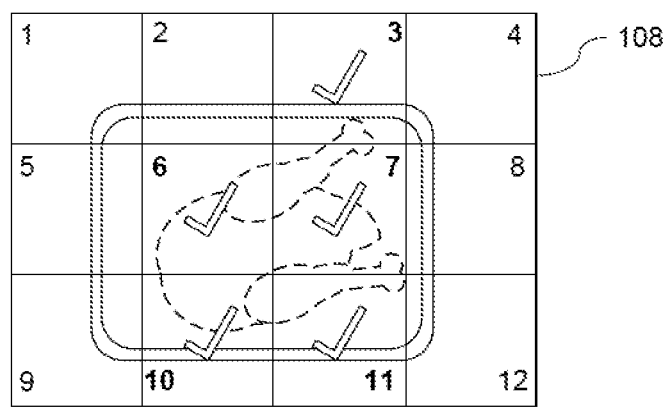
Figure 6D:
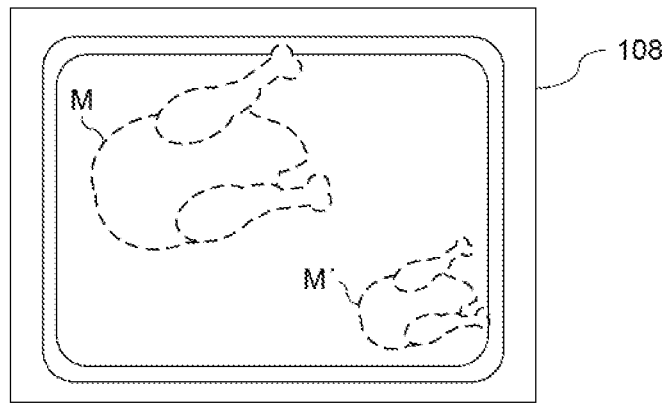
Figure 6E:
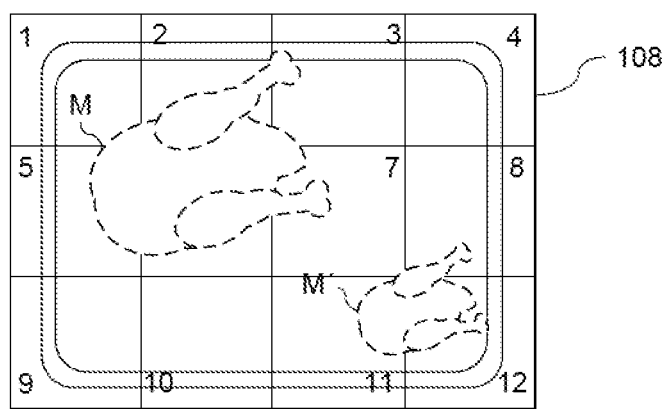
Figure 6F:
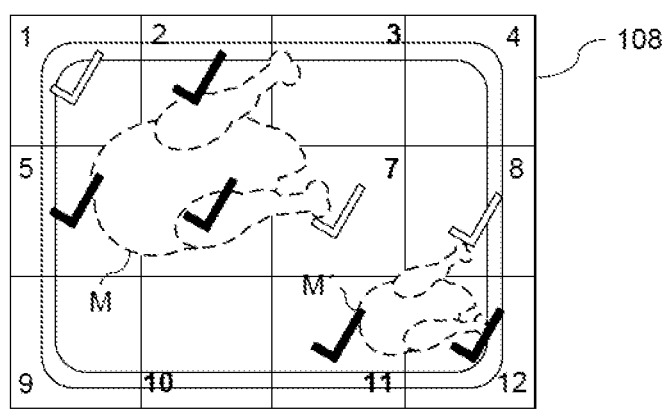

In another example, as shown in FIGS. 6D-6F, the controller 406 can be configured to receive presence and location data of a plurality of objects (e.g., different objects M and M') from the at least one sensor (e.g., 400), and in some cases additional data corresponding to different areas or parts of the objects M and M', and assign (e.g., map or assign in a mathematical correspondence) the presence and location data to the plurality of predetermined zones (e.g., 1-12). The controller 406 optionally can be configured to assign (e.g., map or assign in a mathematical correspondence) different intensities to particular zones corresponding to different objects M and M', as well as corresponding to different areas or parts of the objects M and M. FIGS. 6D-6F schematically illustrate an example of assigned different intensities corresponding to different objects M and M', as well as corresponding to different areas or parts of the objects M and M', using different checkmarks (e.g., a greater intensity is shown by a solid checkmark).

Figure 7:
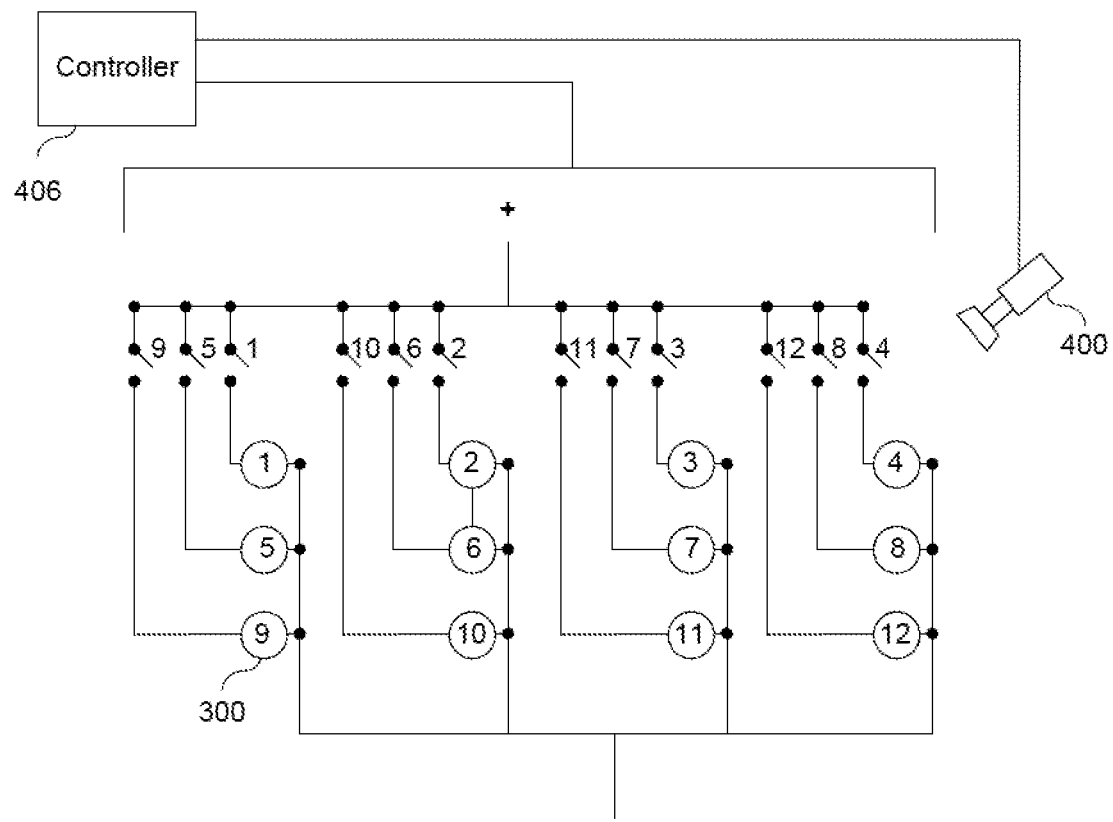
FIG. 7 is a schematic illustration of a circuit having an array of individually switched heating elements, according to an exemplary embodiment of the invention.
Figure 8:
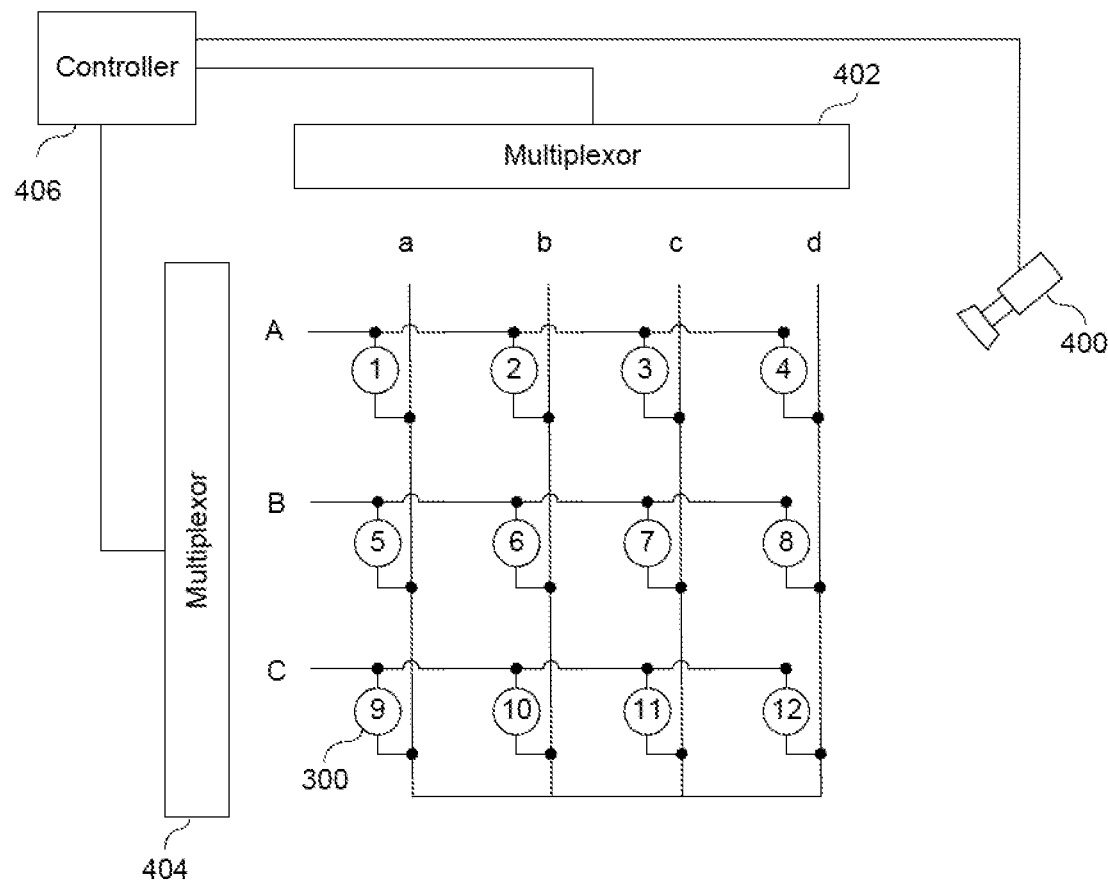
FIG. 8 is a schematic illustration of a circuit having an array of multiplexor controlled heating elements, according to an exemplary embodiment of the invention.

With reference the examples in FIGS. 7 and 8, in some examples, each of the energy transmission elements 300 in the array can be individually addressable and controllable. For example, FIG. 7 illustrates individually switched heating elements 300 in a 3×4 array (numbered 1-12). In this example, the discrete zone energy transmission system can include a computer-controlled (e.g., program controlled) switching system having a controller 406 and a plurality of electronic switching elements (numbered 1-12), switches, or relays, to manage high frequency switching of individual or groups of circuit supplying power to the energy transmission elements 300 in the array. In some examples, clusters or groupings of energy transmission elements 300 may be controlled via a single switch, thereby reducing the number of discrete circuits. In some examples, each individual energy transmission element 300, such as an individual heating element, may consist of an element (e.g., heater element) and a number of components to regulate power and energy flow for that component (such as one or more diodes to prevent back flow of current, etc.).

FIG. 8 shows heating elements 300 in a 3×4 array configured for multiplexor control (numbered 1-12). In this example, the discrete zone energy transmission system can include a multiplexing system having multiplexors 402, 404 configured to individually activate each energy transmission element of the array of energy transmission elements 300, or one or more groups of energy transmission elements 300. The controller 406 can be configured to control the multiplexing system. In other examples, the multiplexing system can be part of the controller 406 or another component.

With reference again to FIGS. 3A-8, and particularly to FIGS. 6A-6C, in the illustrated examples, the array of energy transmission elements 300 (e.g., heating system having an array of heating elements) works in conjunction with the at least one sensor, such as a camera 400, and the controller 406. As shown in FIG. 6A, the at least one sensor (e.g., camera 400) can detect a presence and a location of the object M in the object treatment area (e.g., 104). The controller 406 can be in communication with the array of energy transmission elements 300 and the at least one sensor (e.g., camera 400). As shown in FIG. 6B, the controller 406 can be configured to receive presence and location data of the at least one object M from the at least one sensor (e.g., camera 400) and to assign or map the presence and location data to a plurality of predetermined zones (e.g., zones 1-12). In the example of FIG. 6B, each discrete zone (e.g., zones 3, 6, 7, 10, and 11) selected by the controller 406 (shown by check marks) based on the presence and location data via the sensor (e.g., 400) can correspond to an associated heating element 300 (or cluster of elements) and switching system (e.g., FIG. 7 or 8). In this example, the controller 406 partitions the support surface 108, or a field of view of the support surface 108 by the sensor (e.g., 400), into 12 zones corresponding to the 3×4 array of heating elements 300 (e.g., shown in FIGS. 7 and 8). The controller 406 determines that the object M is present and occupies only zones 3, 6, 7, 10, and 11, and assigns or maps this data to the corresponding energy transmission elements 300 (e.g., heating elements) in the array. The controller 406 can control only the heating elements 300 associated with zones 3, 6, 7, 10, and 11 such that only those zones are activated to radiate energy.

In the examples, the relationship between the zones and the energy transmission elements of the array can be a one-to-one correspondence, or another relationship, such as one-to-two, one-to-three, one-to-four, etc. In some examples, the density (i.e., quantity) of discrete heating zones and/or the corresponding energy transmission elements can be increased to provide more specific control or to correspond to a larger coverage area. In other examples, the density (i.e., quantity) of discrete heating zones and/or the corresponding energy transmission elements can be decreased to provide reduced complexity for the system.

In the example illustrated in FIGS. 6A-6C, the controller 406 can be configured to control the array of energy transmission elements 300 and the sensor (e.g., 400), and to manage the data received from the sensor (e.g., 400) to control the switching and heat output from the energy transmission elements 300 using, for example, the switching or multiplexing arrangements of FIG. 7 or 8. The controller 406 can be configured, for example, to cycle the energy transmission elements 300 ON in a standard duty cycle heating or may proportion the power output to each of the energy transmission elements 300 by high frequency switching for specific energy transmission elements 300 to provide higher power output in some zones and lower power output in other zones. For example, with reference again to FIGS. 6A-6C, the controller 406 can be configured to provide 100% power to the energy transmission elements 300 corresponding to zones 3, 6, 7, 10, and 11, and 50% power to the energy transmission elements 300 corresponding to zones 2, 5, and 9, since zones 2, 5, and 9 are very close to including the object M (food item). The remaining zones (e.g., 1, 4, 8, and 12) can be unpowered, powered very low, or switched at a low duty cycle to effectively provide low power by the controller 406.

In other examples, the controller 406 can be configured to communicate with the sensor (e.g., 400) to receive image data from the sensor (e.g., 400), such as a camera, and then determine an identifying characteristic of the at least one object M in the object treatment area (e.g., 104) from the image data. The controller 406 can be configured to control the operation of the array of energy transmission elements 300 to selectively radiate energy from the array of energy transmission elements 300 based on the determined identifying characteristic of the at least one object. For example, with reference again to FIGS. 6A-6C, the controller 406 can be configured to provide a different percentage of power to the energy transmission elements 300 corresponding to zones 6, 7, and 10, as compared to the energy transmission elements 300 corresponding to zones 3 and 11, based on identifying characteristic of the at least one object.

The examples of the discrete zone energy transmission system can provide important advantages in that, while each individual energy transmission elements 300 may be smaller than a single heating element 20 in conventional systems, a larger total available heating load may be utilized in the present invention because the system does not operate all of the energy transmission elements 300 simultaneously at a maximum power.

Assuming for example, a cooking appliance, such as an oven, would traditionally utilize a 2400 W heating element 20 over the object treatment area. In the example illustrated in FIGS. 6A-6C, assuming each section of the grid area is equal and receives a uniform amount of heating power, the individual zones would each receive 200 W of heating power.

In the example in which 100% power is provided to the energy transmission elements 300 corresponding to zones 3, 6, 7, 10, and 11, a total of 1000 W would directly heat the zones having the food. In some other examples, rather than providing 12 energy transmission elements 300 of 200 W each, the individual energy transmission element 300 could be larger. For example, each energy transmission element 300 could be 300W, such that in the example illustrated in FIGS. 6A-6C, the total available heat over the appliance would now be 3600W, but only 1800 W would be consumed electrically by the 5 active zones, with each of the 5 active zones being targeted at the food below.

Figure 9:
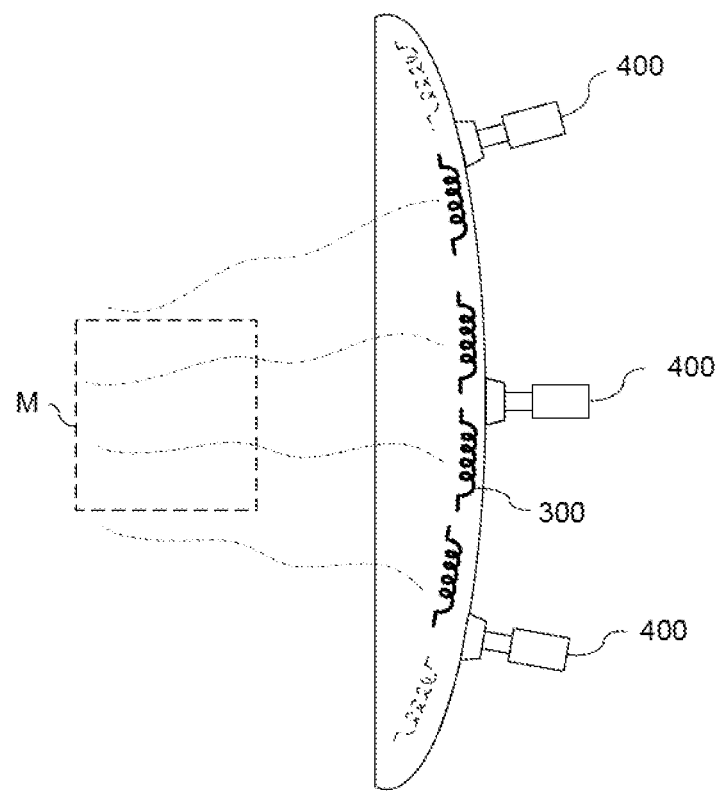
FIG. 9 is a schematic illustration of a home cooking appliance, according to another exemplary embodiment of the invention.
Figure 9:
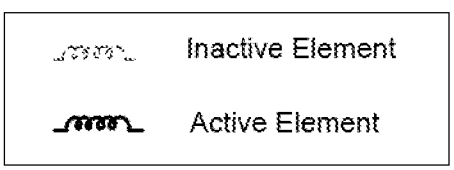
Figure 10:
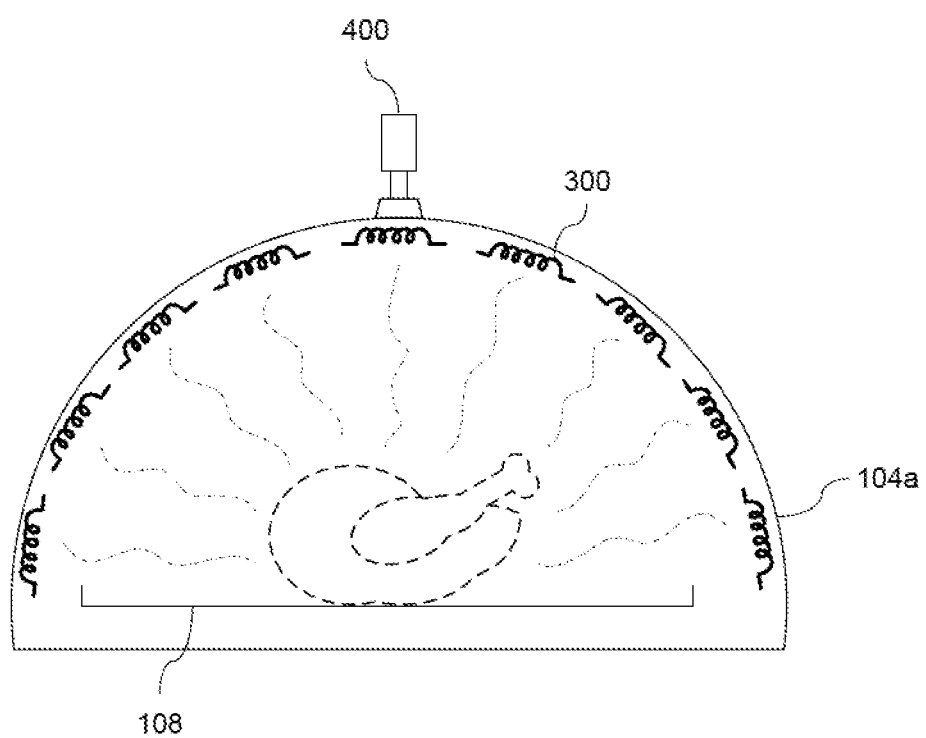
FIG. 10 is a schematic illustration of a home cooking appliance, according to yet another exemplary embodiment of the invention.

As shown in the examples illustrated in FIGS. 9 and 10, the array of energy transmission elements 300 is not limited to a two-dimensional planar arrangement, and can include an array of energy transmission elements having a three-dimensional arrangement. For example, in FIG. 9, the array of energy transmission elements can have a curved arrangement. The arrangement of FIG. 9 can be configured in this manner when viewed from above, or in other examples, when viewed from a side view. In other examples, such a curved arrangement can be arranged at an angle to a support surface that supports one or more objects M. In other examples, the array of energy transmission elements can have a domed arrangement. Other arrangements are contemplated by the present invention, such as an array of energy transmission elements having a cylindrical or spherical surface, a cube-shaped or box-shaped arrangement, among others, for example, such that the array of energy transmission elements can direct energy at one or more objects M from a plurality of sides or directions. The array of energy transmission elements can direct energy at one or more objects M over a variety of ranges, such as a 0°-180° range, or 0°-360° range.

For example, with reference to the example in FIG. 10, a domed energy transmission field (e.g., domed heating field) can be provided. In this example, the array of energy transmission elements can direct energy at one or more objects M over a wide range, such as a 0°-180° range, or greater. For illustrative purposes, the energy directed toward the object M is schematically shown as infrared heat h.

In examples, such as FIG. 10, the controller 406 can be configured to control an operation of the array of energy transmission elements 300 to selectively radiate different intensities (e.g., different magnitudes) of energy from one or more of the energy transmission elements 300 toward a select number of predetermined zones in the object treatment area based on the presence and location data. In this example, the array of energy transmission elements 300 can be arranged in rows extending around an interior surface of a domed object treatment area. In other examples, the array of energy transmission elements 300 can be arranged in rows extending around an interior surface of a cylindrical object treatment area (or ½, ⅓, ¼, etc. cylindrical object treatment area), with columns extending along an axial direction of the object treatment area.

Figure 11A:
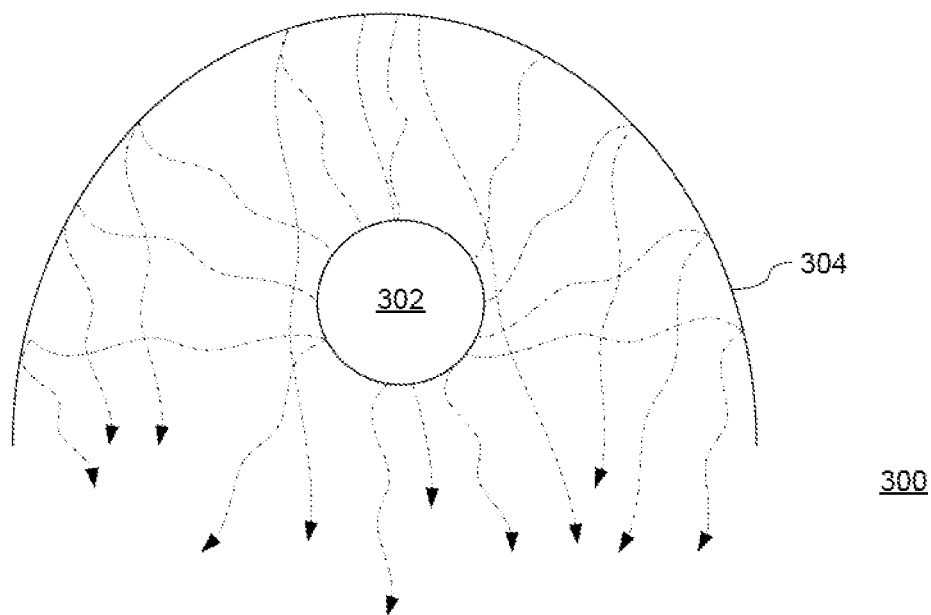
FIGS. 11A and 11B are schematic illustrations of a reflective heating element, according to an exemplary embodiment of the invention.
Figure 11B:
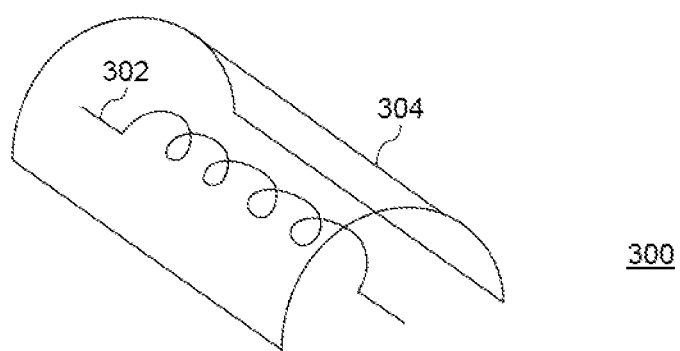
Figure 13A:
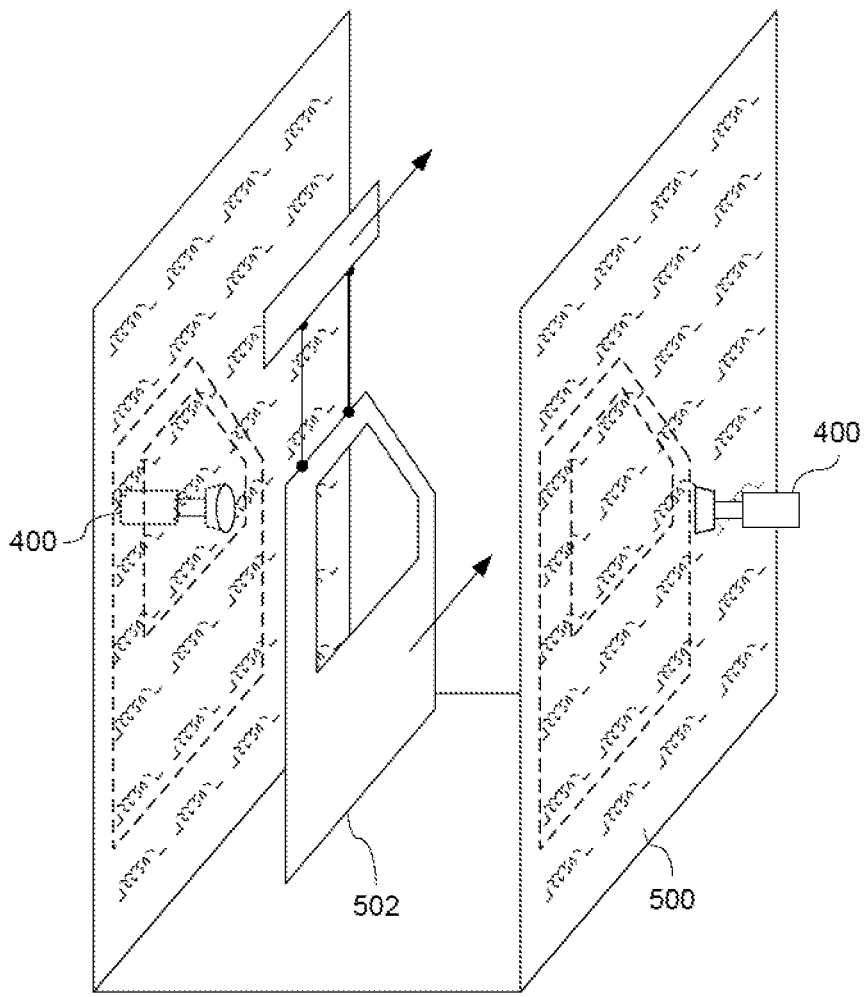
FIGS. 13A-13E are schematic illustrations of an industrial curing oven having a discrete zone energy transmission system, according to another exemplary embodiment of the invention.
Figure 13B:
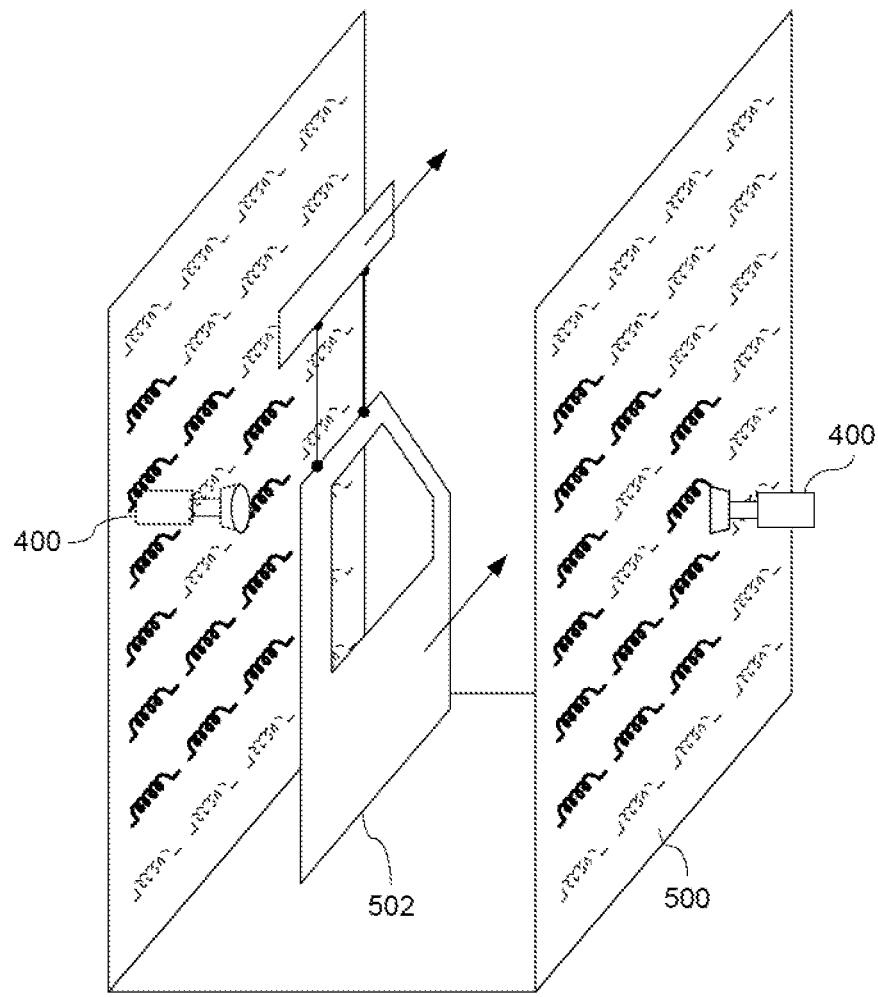
Figure 13B:
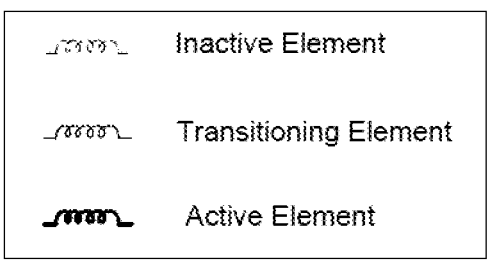
Figure 13C:
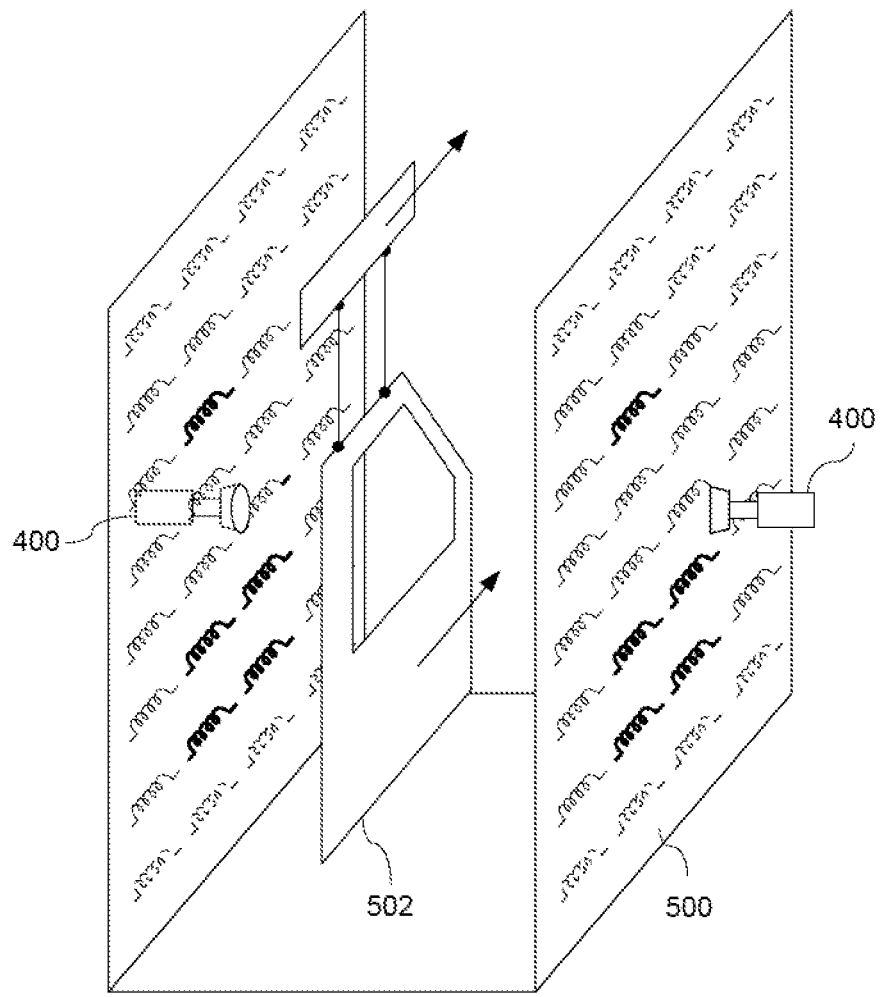
Figure 13D:
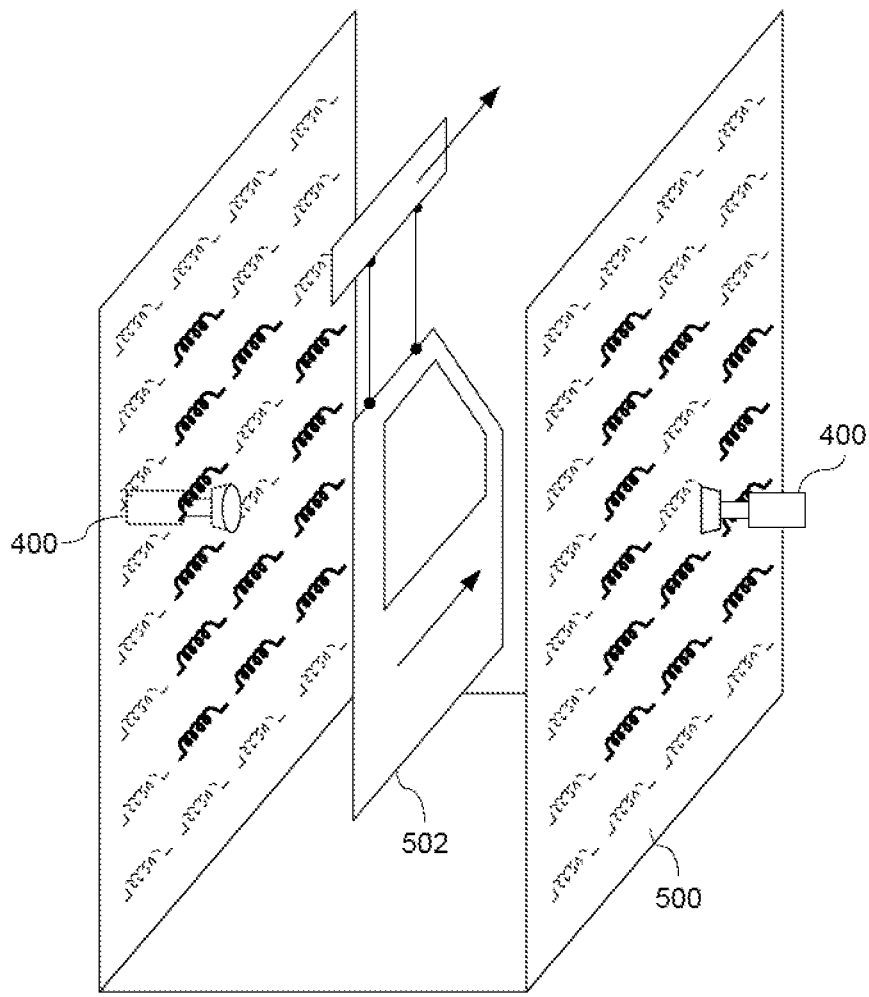
Figure 13D:
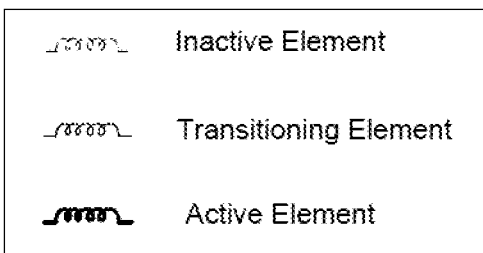
Figure 13E:
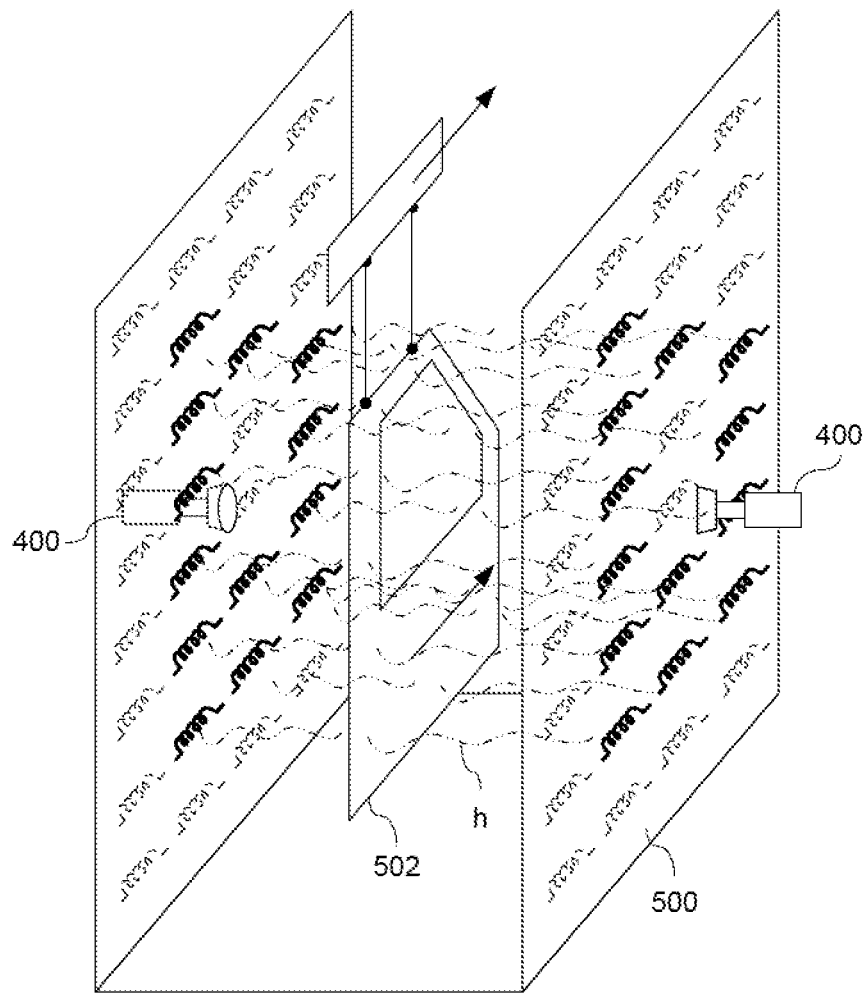
Figure 13E:
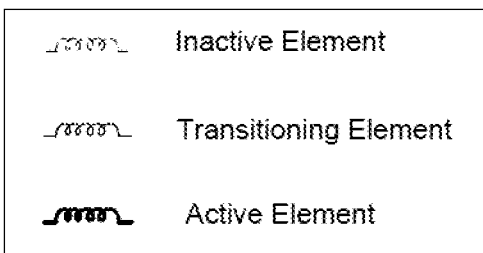

The examples illustrated can be provided with any type of heating device (e.g., electrically resistive, or combustive gas) as well as advanced versions of heating devices such as focused energy (where the design of the heating device or the addition of a reflective device focuses energy to a particular direction). FIGS. 11A and 11B illustrate an example of an energy transmission element 300 having a heating device 302 and a reflective device 304 configured to focus energy from the heating device 302 in a particular direction (shown generally by dashed lines with arrow heads). In examples of an array of energy transmission elements 300, each energy transmission element 300 can have a reflective device 304 that focuses energy from the respective heating device 302 in a particular direction, such as a same general direction as the other energy transmission elements 300 in the array. In other examples, one or more of the energy transmission elements 300 can have a reflective device 304 that focuses energy from the respective heating device 302 in a different direction from one or more other energy transmission elements 300 in the array. For example, in the dome configuration illustrated in FIG. 10, each of the energy transmission elements 300 can have a reflective device 304 that focuses energy from the respective heating device 302 in a different direction toward a common region or zone (e.g., a common focal point, region, or zone) having the object.

While the above-reference examples are described with reference to a home cooking appliance, the examples of the invention are not limited to any particular type of appliance or system. For example, a discrete zone energy transmission system according to the invention can be provided for a dryer or curing device, such as an industrial dryer or curing device, and more particularly, an industrial paint drying or paint curing device for a manufacturing process.

Figure 2:
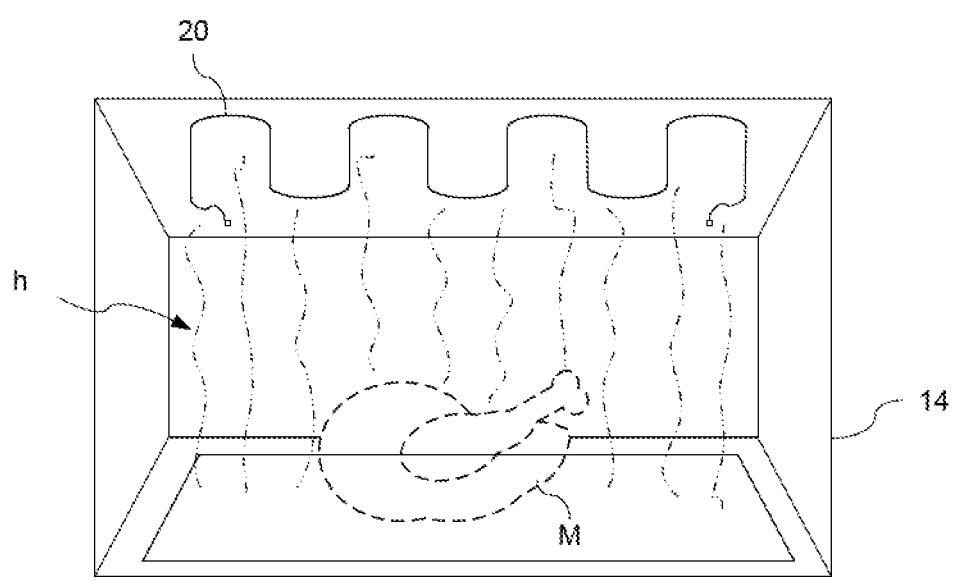
FIG. 2 is a schematic illustration of a cooking process in a conventional home cooking appliance.

For example, a discrete zone energy transmission system can be provided for a dryer or curing device, such as a pass-through curing heater. Industrial curing ovens may be used for curing paints, materials, or coatings by focusing high intensity infrared energy, typically from heat lamps. Conventionally, this may be done using a system where the object to be heated is inserted into treatment area having a large field of heating elements. Such a conventional arrangement may work well in instances in which the object, or parts thereof, have a constant geometry without diversity of parts. However, such conventional arrangements may suffer from similar problems as the conventional arrangements in FIGS. 1 and 2, wherein the field of heating elements heats the object as well as the empty spaces surrounding the object, or gaps or voids of the object (such as window openings), with the same or uniform intensity of energy (or relatively the same or relatively uniform intensity of energy), thereby undesirably consuming power to heat empty space.

With reference to the examples in FIGS. 12A and 12B, and FIGS. 13A-13E, a discrete zone energy transmission system provided for a dryer or curing device, such as a pass-through curing heater, can be provided according to the invention. In this example, a discrete zone energy transmission system can include an object treatment area defined, for examples, by walls 500, and can include an array of energy transmission elements 300 configured to direct energy toward a plurality of predetermined zones in the object treatment area. For illustrative purposes, the energy directed toward the object M is schematically shown as infrared heat h in FIG. 13E. For clarity, the illustration of such energy transmission is omitted from FIGS. 13B-13D.

The zones can correspond to one or more of the energy transmission elements 300 in the array. As shown in FIGS. 13A-13E, discrete zone energy transmission system can include one or more sensors, in this case, one or more cameras 400 directed at the object treatment area. The cameras 400 can be configured to detect a presence and a location of at least one object in the object treatment area, such as a painted or primed automobile door 502 to be dried or cured. A controller (not shown in FIGS. 12A, 12B and 13A-13E) can be arranged in communication with the array of energy transmission elements 300 and the cameras 400. The controller can be configured to receive presence and location data of the door 502 from the cameras 400, assign the presence and location data to a plurality of predetermined zones (e.g., corresponding to one or more of the energy transmission elements 300), and control an operation of the individual energy transmission elements 300 to selectively radiate energy from the array of energy transmission elements 300 only toward a select number of zones where a part of the door 502 is present, thereby selectively radiating the energy from the array of energy transmission elements 300 only toward the parts of the door 502 in the object treatment area.

In this way, the discrete zone energy transmission system can identify the particular regions or zones which are occupied by the components or parts of the door 502 to be heated and can be configured to only activate heating elements (e.g., 300) that are associated with the occupied regions or zones. These features may be particularly useful for handling a plurality of diverse components to be heated, such as a plurality of components having varying geometries, a wide range of sizes, different configurations, different materials, etc. As a result, the discrete zone energy transmission system can be used to perform heating operations on a plurality of diverse components, thereby avoiding having excess heating elements active at all times and consuming excess power, avoiding having to perform multiple set-ups of the system for different components, and/or having multiple ovens or heating systems of varying configurations.

With reference again to the examples in FIGS. 12A and 12B, and FIGS. 13A-13E, a discrete zone energy transmission system according to the invention is not limited to detecting a presence and a location of one or more stationary objects in the object treatment area, but also can be configured for one or more moving objects.

For example, a discrete zone energy transmission system according to examples of the invention can be provided for one or more objects that are intermittently or continuously in motion through the object treatment area, such as objects on a conveyor or overhead carrier system, as shown in FIGS. 13A-13E. In this example, a series of cameras 400, or other sensors, can be configured to track a presence and a location of the door 502 over time as the door 502 transitions or moves through the treatment area. In the illustrated examples, a pair of opposing cameras 400 is shown for a particular portion of the path or direction of travel followed by the door 502. Additional cameras (not shown) can be provided upstream or downstream of the path or direction of travel followed by the door 502. Other arrangements also are possible, such as cameras on only one side, cameras above the direction of travel, etc.

In this example, a controller (not shown in FIGS. 12A, 12B and 13A-13E) can be configured to intermittently or continuously receive presence and location data of the door 502 from the cameras 400 as the door 502 progresses along the path of the conveyor or overhead carrier system. The controller can be configured to intermittently or continuously assign or map the received presence and location data of the door 502 to a plurality of predetermined zones (e.g., corresponding to one or more of the energy transmission elements 300), and control an operation of the individual energy transmission elements 300 to selectively radiate energy (e.g. of the same or different intensities) from the array of energy transmission elements 300 only toward a select number of zones where a part of the door 502 is present as the door 502 progresses along the path of the conveyor or overhead carrier system, thereby selectively radiating the energy from the array of energy transmission elements 300 only toward the parts of the door 502 in the object treatment area even while the door 502 progresses along the path of the conveyor or overhead carrier system.

As shown for example in FIGS. 13A-13E, the controller can activate and deactivate individual energy transmission elements 300 as the door 502 moves away from one set of energy transmission elements 300 toward a field of another set of individual energy transmission elements 300.

In other examples, as shown for example in FIGS. 13A-13E, the controller also can be configured to control a power output or intensity of the individual energy transmission elements 300 as the door 502 moves away from one set of energy transmission elements 300 toward a field of another set of individual energy transmission elements 300. In this example, as the door 502 moves past the fixed energy transmission elements 300, the controller can control the output of the individual energy transmission elements 300 to transition from an activated state, such as a 100% power output, to a reduced percentage (e.g., less than the activated state) as the door 502 moves past the energy transmission element 300 over a predetermined period of time, and eventually to transition from the reduced percentage to a 0% or deactivated state after the door 502 has moved completely past the energy transmission element 300.

Similarly, as the door 502 moves away from one set of energy transmission elements 300 toward a field of another set of individual energy transmission elements 300, the controller can control the output of the individual energy transmission elements 300 downstream of the path of the door 502 to transition those energy transmission elements 300 from a deactivated state, such as a 0% power output, to a reduced percentage (e.g., less than the eventual activated state) as the door 502 moves into proximity of the energy transmission element 300 over a predetermined period of time, and eventually to transition from the reduced percentage to an desired activated state, such as a 100% power output, as the door 502 moves directly in front of the energy transmission element 300.

FIGS. 13A-13E schematically illustrate the energy transmission elements 300 having an inactive state, transitioning state, and active state as the door 502 progresses along the path of the conveyor or overhead carrier system past the array of energy transmission elements 300.

By way of example, and for illustrated purposes only, aspects of the invention are described herein with reference to an array of energy transmission elements configured to direct energy, such as heat, infrared heat, etc., only toward a select number of zones of the plurality of predetermined zones in the object treatment area based on presence and location data of the object, thereby selectively radiating the energy (e.g., heat, infrared heat, etc.) from the array of energy transmission elements only toward the at least one object in the object treatment area. However, the invention is not limited only to a system having an array of energy transmission elements configured to direct energy, such as heat, infrared heat, etc. In other examples, a discrete zone energy transmission system according to the invention can include an array of energy transmission elements configured to direct other types of energy only toward a select number of zones of the plurality of predetermined zones in the object treatment area based on presence and location data of the object, thereby selectively radiating the other types of energy from the array of energy transmission elements only toward the at least one object in the object treatment area. For example, the energy transmission elements configured to direct ultraviolet light only toward the at least one object in the object treatment area. In other examples, the energy transmission elements configured to direct air only toward the at least one object in the object treatment area, such as compressed or pressurized air, and more particularly, compressed or pressurized air conveying particulates, such as sand for sand blasting operations, paint for paint spraying operations, etc.

With reference again to the examples illustrated in FIGS. 3A-13E and described herein, an exemplary embodiment of a discrete zone energy transmission system can include, for example, an object treatment area (e.g., 104), an array of energy transmission elements (e.g., 300) configured to direct energy toward a plurality of predetermined zones (e.g., zones 1-12) in the object treatment area (e.g., 104), at least one sensor (e.g., 400) configured to detect a presence and a location of at least one object (e.g., M) in the object treatment area (e.g., 104), and a controller (e.g., 406) in communication with the array of energy transmission elements (e.g., 300) and the at least one sensor (e.g., 400), the controller (e.g., 406) configured to receive presence and location data of the at least one object (e.g., M) from the at least one sensor (e.g., 400), assign the presence and location data to the plurality of predetermined zones (e.g., zones 1-12), and control an operation of the array of energy transmission elements (e.g., 300) to selectively radiate energy from the array of energy transmission elements (e.g., 300) only toward a select number of zones of the plurality of predetermined zones (e.g., zones 1-12) in the object treatment area (e.g., 104) based on the presence and location data, thereby selectively radiating the energy from the array of energy transmission elements (e.g., 300) only toward the at least one object (e.g., M) in the object treatment area (e.g., 104). In some examples, a discrete zone energy transmission system can be provided in a household appliance including, for example, a housing having the object treatment area therein. In some examples, the household appliance can include a home cooking appliance, wherein the object treatment area is a cooking compartment, wherein the array of energy transmission elements comprises an array of heating elements, and wherein the at least one object includes at least one item to be cooked. In other examples, the home appliance can include a dishwasher appliance, wherein the object treatment area is a washing compartment, wherein the array of energy transmission elements comprises an array of heating elements, and wherein the at least one object includes at least one item to be dried.

The present invention is not limited to any particular example, or exemplary features, or any particular combination of such features illustrated in the examples. Various combinations of a plurality of the exemplary features of one or more examples are possible and are contemplated by the invention.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. A discrete zone energy transmission system, comprising:
   an object treatment area;
   an array of energy transmission elements configured to direct energy toward a plurality of predetermined zones in the object treatment area;
   at least one sensor configured to detect a presence and a location of at least one object in the object treatment area; and
   a controller in communication with the array of energy transmission elements and the at least one sensor, the controller configured to:
      receive presence and location data of the at least one object from the at least one sensor,
      assign the presence and location data to the plurality of predetermined zones, and
      control an operation of the array of energy transmission elements to selectively radiate energy from the array of energy transmission elements only toward a select number of zones of the plurality of predetermined zones in the object treatment area based on the presence and location data, thereby selectively radiating the energy from the array of energy transmission elements only toward the at least one object in the object treatment area.

2. The discrete zone energy transmission system of claim 1, wherein the controller is configured to selectively control a magnitude and direction of the energy radiated from each of the energy transmission elements of the array of energy transmission elements.

3. The discrete zone energy transmission system of claim 1, wherein the controller is configured to control the operation of the array of energy transmission elements to vary an intensity of radiant energy emitted from at least one of the energy transmission elements of the array of energy transmission elements toward at least one zone of the select number of zones.

4. The discrete zone energy transmission system of claim 1, wherein the at least one sensor is configured to detect a presence and a location of each of a plurality of objects in the object treatment area, and
   wherein the controller is configured to control the operation of the array of energy transmission elements to selectively radiate energy from the array of energy transmission elements toward the select number of zones based on the presence and location data to thereby selectively radiate the energy from the array of energy transmission elements only toward each of the plurality of objects.

5. The discrete zone energy transmission system of claim 4, wherein the controller is configured to control the operation of the array of energy transmission elements to:
   radiate a first intensity of energy from at least one of the energy transmission elements toward a first zone of the select number of zones, the first zone corresponding to at least a part of a first object of the plurality of objects, and
   radiate a second intensity of energy from at least one of the energy transmission elements toward a second zone of the select number of zones, the second zone corresponding to at least a part of a second object of the plurality of objects.

6. The discrete zone energy transmission system of claim 1, wherein the array of energy transmission elements is arranged in a plurality of rows and a plurality of columns.

7. The discrete zone energy transmission system of claim 6, wherein the plurality of rows and the plurality of columns of the array of energy transmission elements have a two-dimensional planar arrangement.

8. The discrete zone energy transmission system of claim 6, wherein the plurality of rows and the plurality of columns of the array of energy transmission elements have a three-dimensional arrangement.

9. The discrete zone energy transmission system of claim 8, wherein the three-dimensional arrangement is a curved arrangement.

10. The discrete zone energy transmission system of claim 8, wherein the three-dimensional arrangement is a domed arrangement.

11. The discrete zone energy transmission system of claim 1, further comprising:
    a switching system having a plurality of switches, each switch of the plurality of switches configured to individually activate each energy transmission element of the array of energy transmission elements,
    wherein the controller is configured to control the switching system.

12. The discrete zone energy transmission system of claim 1, further comprising:
    a switching system having a plurality of switches, each switch of the plurality of switches configured to activate a group of energy transmission elements of the array of energy transmission elements, wherein the controller is configured to control the switching system.

13. The discrete zone energy transmission system of claim 1, further comprising:
a multiplexing system configured to individually activate each energy transmission element of the array of energy transmission elements,
wherein the controller is configured to control the multiplexing system.

14. The discrete zone energy transmission system of claim 1, wherein the at least one sensor includes a camera.

15. The discrete zone energy transmission system of claim 14, wherein the controller is configured to:
receive image data from the camera;
determine an identifying characteristic of the at least one object in the object treatment area from the image data; and
control the operation of the array of energy transmission elements to selectively radiate energy from the array of energy transmission elements based on the determined identifying characteristic of the at least one object.

16. The discrete zone energy transmission system of claim 15, wherein the identifying characteristic of the at least one object includes a type of object.

17. The discrete zone energy transmission system of claim 15, wherein the controller is further configured to identify a stored operation program corresponding to the determined identifying characteristic of the at least one object and to control the operation of the array of energy transmission elements to selectively radiate energy from the array of energy transmission elements based on the stored operation program.

18. The discrete zone energy transmission system of claim 1, wherein the at least one sensor includes a plurality of sensors.

19. The discrete zone energy transmission system of claim 18, wherein the plurality of sensors includes at least one sensor type that is different from another sensor type.

20. The discrete zone energy transmission system of claim 1, wherein the array of energy transmission elements comprises an array of heating elements.

21. The discrete zone energy transmission system of claim 20, wherein the heating elements include infrared heating elements.

22. The discrete zone energy transmission system of claim 1, wherein the at least one sensor is configured to intermittently or continuously detect the presence and the location of the at least one object at it moves within the object treatment area, and
wherein the controller is configured to intermittently or continuously:
receive the presence and location data of the at least one object from the at least one sensor,
assign the presence and location data to the plurality of predetermined zones as the at least one object moves within the object treatment area, and
control the operation of the array of energy transmission elements to selectively radiate energy from the array of energy transmission elements only toward the select number of zones of the plurality of predetermined zones in the object treatment area based on the presence and location data the at least one object moves within the object treatment area, thereby selectively radiating the energy from the array of energy transmission elements only toward the at least one object the at least one object moves within the object treatment area.

23. A home appliance having the discrete zone energy transmission system of claim 1, wherein the household appliance includes a housing having the object treatment area therein.

24. The home appliance of claim 23, wherein the home appliance includes a home cooking appliance,
wherein the object treatment area is a cooking compartment,
wherein the array of energy transmission elements comprises an array of heating elements, and
wherein the at least one object includes at least one item to be cooked.

25. The home appliance of claim 23, wherein the home appliance includes a dishwasher appliance,
wherein the object treatment area is a washing compartment,
wherein the array of energy transmission elements comprises an array of heating elements, and
wherein the at least one object includes at least one item to be dried.

* * * * *